US010232791B2

(12) United States Patent
McFadden

(10) Patent No.: US 10,232,791 B2
(45) Date of Patent: Mar. 19, 2019

(54) CROSSBAR-TO-VEHICLE COUPLER

(71) Applicant: Yakima Products, Inc., Lake Oswego, OR (US)

(72) Inventor: Scott A. McFadden, Portland, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 54 days.

(21) Appl. No.: 15/177,053

(22) Filed: Jun. 8, 2016

(65) Prior Publication Data

US 2016/0362063 A1 Dec. 15, 2016

Related U.S. Application Data

(60) Provisional application No. 62/173,333, filed on Jun. 9, 2015, provisional application No. 62/175,192, filed on Jun. 12, 2015.

(51) Int. Cl.
| | |
|---|---|
| *B60R 9/00* | (2006.01) |
| *B60R 9/058* | (2006.01) |
| *B60R 9/05* | (2006.01) |
| *B60R 9/052* | (2006.01) |
| *B60R 11/00* | (2006.01) |

(52) U.S. Cl.
CPC .............. *B60R 9/058* (2013.01); *B60R 9/05* (2013.01); *B60R 9/052* (2013.01); *B60R 2011/0059* (2013.01)

(58) Field of Classification Search
CPC ........... B60R 9/058; B60R 9/05; B60R 9/052; B60R 2011/0059
USPC ......................................................... 224/330
See application file for complete search history.

(56) References Cited

U.S. PATENT DOCUMENTS

| 488,395 A | 12/1892 | Justice |
| 529,827 A | 11/1894 | Fonda |
| 556,789 A | 3/1896 | Walker |
| 576,351 A | 2/1897 | Penfield |

(Continued)

FOREIGN PATENT DOCUMENTS

| AU | 2003231667 A1 | 2/2004 |
| AU | 2006100386 A4 | 6/2006 |

(Continued)

OTHER PUBLICATIONS

Yakima Car Racks, Wing Bars and Locking RailRiders, 1997 Catalog, p. 9.

(Continued)

*Primary Examiner* — Peter Helvey
(74) *Attorney, Agent, or Firm* — Kolisch Hartwell, P.C.

(57) ABSTRACT

A crossbar-to-vehicle coupler may include one or more locking pins operatively connected to a pivoting cover, such that moving the cover from an open to a closed position causes the locking pins to engage corresponding recesses in a base portion fixed to a vehicle rooftop. The coupler may include a selectable pitch interface for adjusting the pitch angle of the crossbar with respect to the coupler and/or a vehicle on which the coupler is mounted. An actuator of the coupler may convert motion of a tightening screw oriented parallel to the crossbar axis into a clamp tightening force oriented orthogonal to the crossbar axis. The tightening screw may be inaccessible when the cover of the coupler is in the closed position.

11 Claims, 18 Drawing Sheets

(56) References Cited

U.S. PATENT DOCUMENTS

| | | |
|---|---|---|
| 586,681 A | 7/1897 | Douglas |
| 607,024 A | 7/1898 | Durfee et al. |
| 614,264 A | 11/1898 | Fletcher |
| 615,264 A | 12/1898 | Du Pont |
| 1,179,823 A | 4/1916 | Greene |
| 1,789,458 A | 1/1931 | Bureau |
| 2,206,328 A | 7/1940 | Martinek |
| 2,248,170 A | 7/1941 | Hansen |
| 2,302,300 A | 11/1942 | Davies |
| 2,317,195 A | 4/1943 | Husted |
| 2,415,286 A | 2/1947 | Hyde |
| 2,431,400 A | 11/1947 | Iverson |
| 2,536,797 A | 1/1951 | Cooke |
| 2,551,218 A | 5/1951 | Menne |
| 2,573,187 A | 10/1951 | Désilets |
| 2,584,283 A | 2/1952 | Oliver et al. |
| 2,613,020 A | 10/1952 | Berry |
| 2,696,231 A | 12/1954 | Pardo |
| 2,723,005 A | 11/1955 | Wink |
| 2,729,499 A | 1/1956 | Eggum |
| 2,816,672 A | 12/1957 | Facchini |
| 2,988,253 A | 6/1961 | Menghi |
| 3,001,679 A | 9/1961 | Canning et al. |
| 3,042,240 A | 7/1962 | Cline |
| 3,064,868 A | 11/1962 | Treydte |
| 3,113,642 A | 12/1963 | Lay |
| 3,116,836 A | 1/1964 | McCauley |
| 3,155,249 A | 11/1964 | Johnson |
| 3,186,569 A | 6/1965 | Roux |
| 3,190,587 A | 6/1965 | Fries |
| 3,221,960 A | 12/1965 | Gleason et al. |
| 3,239,115 A | 3/1966 | Bott et al. |
| 3,240,406 A | 3/1966 | Logan |
| 3,276,085 A | 10/1966 | Spranger |
| 3,300,171 A | 1/1967 | Watts |
| 3,378,182 A | 4/1968 | McMiller |
| RE26,538 E | 3/1969 | Bott |
| RE26,539 E | 3/1969 | Bott |
| 3,430,983 A | 3/1969 | Jones |
| 3,460,694 A | 8/1969 | Simms |
| 3,469,810 A | 9/1969 | Dorris |
| 3,519,180 A | 7/1970 | Bott |
| 3,529,737 A | 9/1970 | Daugherty |
| 3,554,416 A | 1/1971 | Bott |
| 3,581,962 A | 6/1971 | Osborn |
| 3,596,788 A | 8/1971 | Willie |
| 3,606,432 A | 9/1971 | Honatzis |
| 3,615,069 A | 10/1971 | Bott |
| 3,642,157 A | 2/1972 | Williams, Jr. |
| 3,643,973 A | 2/1972 | Bott |
| 3,677,195 A | 7/1972 | Prete, Jr. |
| 3,677,451 A | 7/1972 | Burland |
| 3,737,083 A | 6/1973 | Lund |
| 3,740,034 A | 6/1973 | Scroggins |
| 3,744,689 A | 7/1973 | Kjensmo |
| 3,777,922 A | 12/1973 | Kirchmeyer |
| 3,826,390 A | 7/1974 | Watson |
| 3,828,993 A | 8/1974 | Carter |
| 3,843,001 A | 10/1974 | Willis |
| 3,848,784 A | 11/1974 | Shimano et al. |
| 3,848,785 A | 11/1974 | Bott |
| 3,858,774 A | 1/1975 | Friis |
| 3,861,533 A | 1/1975 | Radek |
| 3,892,455 A | 7/1975 | Sotolongo |
| D238,771 S | 2/1976 | Spokus, Sr. |
| 3,946,917 A | 3/1976 | Crawford et al. |
| 3,951,320 A | 4/1976 | Bott |
| 3,976,213 A | 8/1976 | Ball |
| 3,993,167 A | 11/1976 | Reed |
| 4,015,760 A | 4/1977 | Bott |
| 4,022,362 A | 5/1977 | Revercomb |
| 4,023,761 A | 5/1977 | Molis |
| 4,034,879 A | 7/1977 | Cudmore |
| 4,046,297 A | 9/1977 | Bland |
| 4,050,616 A | 9/1977 | Mosow |
| 4,055,284 A | 10/1977 | Bott |
| 4,058,243 A | 11/1977 | Tappan |
| 4,081,118 A | 3/1978 | Mason |
| 4,085,763 A | 4/1978 | Thomas |
| 4,089,448 A | 5/1978 | Traeger |
| 4,099,658 A | 7/1978 | Bott |
| 4,106,680 A | 8/1978 | Bott |
| 4,114,409 A | 9/1978 | Scire |
| 4,126,228 A | 11/1978 | Bala et al. |
| 4,132,335 A | 1/1979 | Ingram |
| 4,156,497 A | 5/1979 | Bott |
| 4,162,755 A | 7/1979 | Bott |
| 4,165,827 A | 8/1979 | Bott |
| 4,170,322 A | 10/1979 | Bott |
| 4,171,077 A | 10/1979 | Richard, Jr. |
| 4,174,794 A | 11/1979 | Bott |
| 4,175,682 A | 11/1979 | Bott |
| 4,182,471 A | 1/1980 | Bott |
| 4,213,593 A | 7/1980 | Weik |
| 4,213,729 A | 7/1980 | Cowles et al. |
| 4,222,508 A | 9/1980 | Bott |
| 4,239,139 A | 12/1980 | Bott |
| 4,245,764 A | 1/1981 | Kowalski et al. |
| 4,264,025 A | 4/1981 | Ferguson et al. |
| 4,269,339 A | 5/1981 | Bott |
| 4,274,568 A | 6/1981 | Bott |
| 4,274,569 A | 6/1981 | Winter et al. |
| 4,274,570 A | 6/1981 | Bott |
| 4,277,009 A | 7/1981 | Bott |
| 4,295,587 A | 10/1981 | Bott |
| 4,323,182 A | 4/1982 | Bott |
| 4,326,655 A | 4/1982 | Gradek et al. |
| D264,203 S | 5/1982 | Bott |
| 4,342,411 A | 8/1982 | Bott |
| 4,350,380 A | 9/1982 | Williams |
| 4,358,037 A | 11/1982 | Heideman |
| 4,364,500 A | 12/1982 | Bott |
| 4,372,469 A | 2/1983 | Kowalski et al. |
| 4,401,247 A | 8/1983 | Zoor |
| 4,402,442 A | 9/1983 | Martino |
| 4,403,716 A | 9/1983 | Carlson et al. |
| 4,406,386 A | 9/1983 | Rasor et al. |
| 4,427,141 A | 1/1984 | Bott |
| 4,428,517 A | 1/1984 | Bott |
| 4,431,123 A | 2/1984 | Bott |
| 4,432,478 A | 2/1984 | Bott |
| 4,433,804 A | 2/1984 | Bott |
| 4,437,597 A | 3/1984 | Doyle |
| 4,440,333 A | 4/1984 | Bott |
| 4,442,961 A | 4/1984 | Bott |
| 4,448,336 A | 5/1984 | Bott |
| 4,448,337 A | 5/1984 | Cronce |
| 4,449,656 A | 5/1984 | Wouden |
| 4,460,116 A | 7/1984 | Bott |
| 4,469,261 A | 9/1984 | Stapleton et al. |
| 4,473,178 A | 9/1984 | Bott |
| 4,487,348 A | 12/1984 | Mareydt |
| 4,501,385 A | 2/1985 | Bott |
| 4,516,709 A | 5/1985 | Bott |
| 4,524,893 A | 6/1985 | Cole |
| D282,155 S | 1/1986 | Bott |
| 4,586,638 A | 5/1986 | Prescott et al. |
| 4,588,117 A | 5/1986 | Bott |
| 4,589,622 A | 5/1986 | Hutter |
| 4,616,771 A | 10/1986 | Heideman |
| 4,629,104 A | 12/1986 | Jacquet |
| 4,630,990 A | 12/1986 | Whiting |
| 4,639,039 A | 1/1987 | Nichols |
| 4,640,450 A | 2/1987 | Gallion et al. |
| 4,673,119 A | 6/1987 | Bott |
| 4,684,048 A | 8/1987 | Bott |
| 4,684,049 A | 8/1987 | Maby et al. |
| 4,688,706 A | 8/1987 | Thulin |
| 4,700,873 A | 10/1987 | Young |
| 4,702,398 A | 10/1987 | Seager |
| 4,702,401 A | 10/1987 | Graber et al. |
| RE32,583 E | 1/1988 | Bott |
| 4,717,165 A | 1/1988 | Johnson |
| 4,721,239 A | 1/1988 | Gibbs, III et al. |

(56) References Cited

U.S. PATENT DOCUMENTS

| | | |
|---|---|---|
| D294,340 S | 2/1988 | Robson |
| 4,724,692 A | 2/1988 | Turin et al. |
| 4,751,891 A | 6/1988 | Wilson |
| 4,754,905 A | 7/1988 | Bott |
| 4,757,929 A | 7/1988 | Nelson |
| 4,770,329 A | 9/1988 | Kamaya |
| 4,778,092 A | 10/1988 | Grace |
| 4,789,145 A | 12/1988 | Wenrich |
| D300,734 S | 4/1989 | Kruitbosch |
| 4,817,838 A | 4/1989 | Kamaya |
| 4,823,997 A | 4/1989 | Krieger |
| 4,830,249 A | 5/1989 | Mirenda et al. |
| 4,830,250 A | 5/1989 | Newbold et al. |
| 4,838,467 A | 6/1989 | Bott et al. |
| 4,848,112 A | 7/1989 | Graber et al. |
| 4,848,794 A | 7/1989 | Mader et al. |
| 4,875,608 A | 10/1989 | Graber |
| 4,877,168 A | 10/1989 | Bott |
| 4,877,169 A | 10/1989 | Grim |
| 4,887,754 A | 12/1989 | Boyer et al. |
| 4,890,777 A | 1/1990 | Bott |
| 4,892,279 A | 1/1990 | Lafferty et al. |
| 4,895,096 A | 1/1990 | Goodwin et al. |
| 4,899,917 A | 2/1990 | Bott |
| 4,911,348 A | 3/1990 | Rasor et al. |
| 4,917,428 A | 4/1990 | Sola |
| 4,917,429 A | 4/1990 | Giger |
| 4,934,572 A | 6/1990 | Bowman et al. |
| 4,944,439 A | 7/1990 | Bott |
| D310,196 S | 8/1990 | Bott |
| 4,960,356 A | 10/1990 | Wrenn |
| 4,961,524 A | 10/1990 | Hunts |
| 4,964,287 A | 10/1990 | Gaul |
| 4,967,945 A | 11/1990 | Bott |
| 4,972,983 A | 11/1990 | Bott |
| 4,976,123 A | 12/1990 | Ceron et al. |
| 4,993,615 A | 2/1991 | Arvidsson |
| 4,995,538 A | 2/1991 | Marengo |
| 4,997,332 A | 3/1991 | Johnson |
| 5,005,390 A | 4/1991 | Giannini et al. |
| 5,025,932 A | 6/1991 | Jay |
| 5,025,967 A | 6/1991 | Cronce et al. |
| 5,029,740 A | 7/1991 | Cox |
| 5,033,709 A | 7/1991 | Yuen |
| 5,037,019 A | 8/1991 | Sokn |
| 5,038,988 A | 8/1991 | Thulin |
| 5,042,705 A | 8/1991 | Johansson |
| 5,052,605 A | 10/1991 | Johansson |
| 5,056,700 A | 10/1991 | Blackburn et al. |
| 5,065,921 A | 11/1991 | Mobley |
| 5,071,050 A * | 12/1991 | Pudney ............... B60R 9/045 224/321 |
| 5,118,020 A | 6/1992 | Piretti |
| 5,118,125 A | 6/1992 | Plunkett |
| 5,119,654 A | 6/1992 | Ceron et al. |
| 5,123,147 A | 6/1992 | Blair |
| 5,131,669 A | 7/1992 | Kinnamon et al. |
| 5,136,709 A | 8/1992 | Shirakabe et al. |
| 5,137,195 A | 8/1992 | Walter |
| 5,143,267 A | 9/1992 | Cucheran et al. |
| 5,158,425 A | 10/1992 | Bott |
| 5,169,042 A | 12/1992 | Ching |
| 5,169,044 A | 12/1992 | Englander |
| 5,170,920 A | 12/1992 | Corrente et al. |
| 5,201,487 A | 4/1993 | Epplett |
| 5,201,911 A | 4/1993 | Lee |
| 5,203,483 A | 4/1993 | Cucheran |
| 5,205,453 A | 4/1993 | Pudney et al. |
| 5,207,365 A | 5/1993 | Bott |
| 5,215,233 A | 6/1993 | Baldeck |
| 5,217,149 A | 6/1993 | Simonett |
| 5,226,341 A | 7/1993 | Shores |
| 5,226,570 A | 7/1993 | Pedrini |
| 5,226,634 A | 7/1993 | Rudy, Jr. et al. |
| 5,230,449 A | 7/1993 | Collins et al. |
| 5,232,134 A | 8/1993 | Allen |
| 5,232,138 A | 8/1993 | Cucheran |
| 5,236,153 A | 8/1993 | LaConte |
| 5,244,101 A | 9/1993 | Palmer et al. |
| 5,253,913 A | 10/1993 | Metivier |
| 5,257,710 A | 11/1993 | Cropley |
| 5,259,542 A | 11/1993 | Newbold et al. |
| 5,275,319 A | 1/1994 | Ruana |
| 5,275,320 A | 1/1994 | Duemmler |
| 5,282,560 A | 2/1994 | Ozog |
| 5,282,562 A | 2/1994 | Legault |
| 5,284,282 A | 2/1994 | Mottino |
| 5,291,763 A | 3/1994 | Cuisinot |
| 5,294,033 A | 3/1994 | Duemmler |
| 5,314,104 A | 5/1994 | Lee |
| 5,320,264 A | 6/1994 | Weir |
| 5,326,007 A | 7/1994 | Pudney et al. |
| D349,680 S | 8/1994 | Powell |
| D350,527 S | 9/1994 | Parlor, Sr. |
| 5,346,355 A | 9/1994 | Riemer |
| 5,360,150 A | 11/1994 | Praz |
| 5,375,750 A | 12/1994 | Mandarino et al. |
| 5,385,285 A | 1/1995 | Cucheran et al. |
| 5,388,938 A | 2/1995 | Helton |
| 5,397,042 A | 3/1995 | Pedrini |
| 5,400,938 A | 3/1995 | Kolodziej et al. |
| 5,416,957 A | 5/1995 | Renzi, Sr. et al. |
| 5,419,479 A | 5/1995 | Evels et al. |
| 5,433,356 A | 7/1995 | Russell |
| 5,433,550 A | 7/1995 | Huber |
| 5,435,475 A | 7/1995 | Hudson et al. |
| 5,442,840 A | 8/1995 | Ewald |
| 5,443,190 A | 8/1995 | Cucheran et al. |
| 5,445,300 A | 8/1995 | Eipper et al. |
| 5,452,831 A | 9/1995 | Linnhoff |
| 5,456,396 A | 10/1995 | Allen |
| 5,456,512 A | 10/1995 | Gibbs et al. |
| 5,458,268 A | 10/1995 | Hill |
| 5,471,714 A | 12/1995 | Olson |
| 5,474,218 A | 12/1995 | Arsenault, Jr. et al. |
| 5,476,201 A | 12/1995 | Hall et al. |
| 5,492,258 A | 2/1996 | Brunner |
| 5,499,762 A | 3/1996 | Lee |
| D369,140 S | 4/1996 | Sills |
| 5,511,894 A | 4/1996 | Ng |
| 5,516,017 A | 5/1996 | Arvidsson |
| 5,526,971 A | 6/1996 | Despain |
| 5,535,930 A | 7/1996 | Lee |
| 5,549,231 A | 8/1996 | Fletcher et al. |
| D373,988 S | 9/1996 | Johnson |
| 5,553,761 A | 9/1996 | Audoire et al. |
| 5,556,221 A | 9/1996 | Brunner |
| 5,570,825 A | 11/1996 | Cona |
| 5,577,650 A | 11/1996 | Stapleton |
| 5,582,044 A | 12/1996 | Bolich |
| 5,598,959 A | 2/1997 | Lorensen et al. |
| 5,617,617 A | 4/1997 | Gustin |
| 5,624,063 A | 4/1997 | Ireland |
| 5,628,336 A | 5/1997 | Lee |
| 5,647,522 A | 7/1997 | Routh |
| 5,657,913 A | 8/1997 | Cucheran et al. |
| D386,145 S | 11/1997 | Staller |
| 5,692,659 A | 12/1997 | Reeves |
| 5,695,164 A | 12/1997 | Hartmann et al. |
| 5,697,629 A | 12/1997 | Guild |
| 5,701,628 A | 12/1997 | Morad |
| 5,709,521 A | 1/1998 | Glass et al. |
| 5,730,343 A | 3/1998 | Settelmayer |
| 5,738,258 A | 4/1998 | Farrow et al. |
| 5,762,248 A | 6/1998 | Englander et al. |
| 5,769,291 A | 6/1998 | Chasan |
| 5,769,292 A | 6/1998 | Cucheran et al. |
| 5,775,557 A | 7/1998 | Arvidsson |
| 5,779,119 A | 7/1998 | Talbot et al. |
| 5,806,735 A | 9/1998 | Christiansson et al. |
| 5,810,226 A | 9/1998 | Lee |
| 5,820,002 A | 10/1998 | Allen |
| 5,826,765 A | 10/1998 | Rak et al. |
| 5,833,074 A | 11/1998 | Phillips |

(56) References Cited

U.S. PATENT DOCUMENTS

| | | | |
|---|---|---|---|
| 5,845,828 | A | 12/1998 | Settelmayer |
| 5,848,743 | A | 12/1998 | Derecktor |
| 5,862,966 | A | 1/1999 | Mehls |
| 5,868,621 | A | 2/1999 | Parsons |
| 5,875,947 | A | 3/1999 | Noel et al. |
| 5,924,614 | A | 7/1999 | Kuntze et al. |
| 5,944,198 | A | 8/1999 | Ihalainen |
| 5,951,231 | A | 9/1999 | Allen |
| 5,984,155 | A | 11/1999 | Stapleton |
| 5,988,403 | A | 11/1999 | Robideau |
| 5,992,645 | A | 11/1999 | West |
| 5,992,805 | A | 11/1999 | Tanner |
| 5,996,736 | A | 12/1999 | Stankiewicz |
| 6,010,048 | A | 1/2000 | Settelmayer |
| 6,015,074 | A | 1/2000 | Snavely et al. |
| 6,019,266 | A | 2/2000 | Johnson |
| 6,050,467 | A | 4/2000 | Drouillard et al. |
| 6,053,336 | A | 4/2000 | Reeves |
| 6,062,450 | A | 5/2000 | Noel et al. |
| 6,102,265 | A | 8/2000 | Stapleton |
| 6,105,841 | A | 8/2000 | Aftanas |
| 6,112,965 | A | 9/2000 | Lundgren |
| 6,131,781 | A | 10/2000 | Murray |
| 6,164,507 | A | 12/2000 | Dean et al. |
| 6,176,404 | B1 | 1/2001 | Fourel |
| 6,182,876 | B1 | 2/2001 | Moliner |
| 6,189,868 | B1 | 2/2001 | Santelli, Jr. |
| 6,193,252 | B1 | 2/2001 | Lin |
| 6,244,483 | B1 | 6/2001 | McLemore et al. |
| 6,273,311 | B1 | 8/2001 | Pedrini |
| 6,276,747 | B1 | 8/2001 | Ogawa et al. |
| 6,279,802 | B1 | 8/2001 | Hickman et al. |
| 6,283,310 | B1 | 9/2001 | Dean et al. |
| 6,286,738 | B1 | 9/2001 | Robins et al. |
| 6,296,162 | B1 | 10/2001 | Englander et al. |
| 6,305,589 | B1 | 10/2001 | Chimenti et al. |
| 6,357,643 | B1 | 3/2002 | Janner et al. |
| 6,385,822 | B1 | 5/2002 | Dean et al. |
| D460,401 | S | 7/2002 | Andersson |
| 6,422,441 | B1 | 7/2002 | Settelmayer et al. |
| 6,439,397 | B1 | 8/2002 | Reeves |
| 6,460,743 | B2 | 10/2002 | Edgerly et al. |
| D467,220 | S | 12/2002 | Walstrom et al. |
| 6,488,249 | B1 | 12/2002 | Girardi et al. |
| 6,491,192 | B2 | 12/2002 | Aki |
| 6,491,195 | B1 | 12/2002 | McLemore et al. |
| 6,494,351 | B1 | 12/2002 | Dean |
| 6,516,985 | B1 | 2/2003 | Lundgren |
| 6,523,730 | B2 | 2/2003 | Anderson |
| 6,523,731 | B1 | 2/2003 | Pedrini |
| 6,557,931 | B1 | 5/2003 | Tremmel et al. |
| 6,561,398 | B1 | 5/2003 | Cole et al. |
| 6,568,644 | B2 | 5/2003 | Pedersen |
| 6,622,898 | B1 | 9/2003 | Wang |
| 6,640,979 | B1 | 11/2003 | Mayfield |
| 6,648,300 | B2 | 11/2003 | Chamoun |
| 6,662,982 | B1 | 12/2003 | Pakkila |
| 6,681,971 | B2 | 1/2004 | Laverack et al. |
| D487,720 | S | 3/2004 | Thomas |
| 6,715,653 | B2 | 4/2004 | DeCosta |
| 6,722,541 | B1 | 4/2004 | Aftanas et al. |
| 6,736,300 | B2 | 5/2004 | Deakin |
| 6,736,301 | B1 | 5/2004 | Huang |
| 6,761,297 | B1 | 7/2004 | Pedrini |
| 6,766,929 | B2 | 7/2004 | Karlsson |
| 6,779,696 | B2 | 8/2004 | Aftanas et al. |
| 6,793,186 | B2 | 9/2004 | Pedersen |
| 6,796,471 | B2 | 9/2004 | Aftanas et al. |
| 6,817,500 | B2 | 11/2004 | Neaux |
| 6,840,418 | B2 | 1/2005 | Robins et al. |
| 6,843,394 | B2 | 1/2005 | Aki |
| 6,845,893 | B2 | 1/2005 | Nelson |
| 6,845,922 | B2 | 1/2005 | Stark |
| 6,857,545 | B2 | 2/2005 | McLemore et al. |
| 6,868,998 | B2 | 3/2005 | Dean |
| 6,892,912 | B1 | 5/2005 | MacNeil |
| 6,892,913 | B1 | 5/2005 | Andersson |
| 6,905,053 | B2 | 6/2005 | Allen |
| 6,918,521 | B2 | 7/2005 | Settelmayer et al. |
| 6,938,782 | B2 | 9/2005 | Dean et al. |
| 6,968,986 | B1 | 11/2005 | Lloyd et al. |
| 6,972,042 | B2 | 12/2005 | Benson |
| 6,976,615 | B2 | 12/2005 | Dean |
| 6,997,657 | B1 | 2/2006 | Saward |
| 7,000,811 | B2 | 2/2006 | Gilstrap et al. |
| 7,004,365 | B2 | 2/2006 | Ingram |
| 7,036,698 | B2 | 5/2006 | Allen |
| 7,044,347 | B1 | 5/2006 | Pedrini |
| 7,051,909 | B2 | 5/2006 | Gibson |
| 7,104,430 | B2 | 9/2006 | Reeves |
| 7,117,768 | B1 | 10/2006 | Stoeppelwerth |
| 7,131,561 | B2 | 11/2006 | Humes |
| 7,175,218 | B1 | 2/2007 | Keene |
| 7,182,233 | B1 | 2/2007 | Graffy et al. |
| 7,201,436 | B2 | 4/2007 | Ludwig et al. |
| 7,222,763 | B2 | 5/2007 | Pedrini |
| 7,234,617 | B2 | 6/2007 | Weaver et al. |
| 7,240,816 | B2 | 7/2007 | Tsai |
| D561,680 | S | 2/2008 | Foley et al. |
| D562,217 | S | 2/2008 | Davis et al. |
| D562,218 | S | 2/2008 | Foley et al. |
| 7,328,824 | B2 | 2/2008 | Smith et al. |
| D564,438 | S | 3/2008 | Moore |
| D566,034 | S | 4/2008 | Davis et al. |
| 7,357,283 | B2 | 4/2008 | Settelmayer |
| 7,367,481 | B2 | 5/2008 | Barbara |
| 7,404,504 | B2 | 7/2008 | Settelmayer |
| 7,413,143 | B2 | 8/2008 | Frantz et al. |
| 7,416,098 | B2 | 8/2008 | Settelmayer et al. |
| 7,427,049 | B2 | 9/2008 | Kennedy et al. |
| 7,481,344 | B2 | 1/2009 | Näslund et al. |
| 7,641,249 | B2 | 1/2010 | Jung |
| 7,648,151 | B2 | 1/2010 | Pedrini |
| 7,721,925 | B1 | 5/2010 | Graffy et al. |
| 7,726,528 | B2 | 6/2010 | Foley |
| 7,757,914 | B2 | 7/2010 | Book et al. |
| D622,208 | S | 8/2010 | Sautter et al. |
| 7,784,656 | B2 | 8/2010 | Morrill et al. |
| D623,117 | S | 9/2010 | Farber |
| 7,815,084 | B2 | 10/2010 | Allen et al. |
| D633,030 | S | 2/2011 | Robertson |
| D635,086 | S | 3/2011 | Shen |
| D638,778 | S | 5/2011 | Giddens |
| D642,113 | S | 7/2011 | Farber |
| 7,975,888 | B2 | 7/2011 | Settelmayer |
| 8,020,737 | B2 | 9/2011 | Sweeney |
| 8,021,169 | B1 | 9/2011 | Smith |
| 8,087,557 | B2 | 1/2012 | Larsson et al. |
| 8,104,651 | B2 | 1/2012 | Bingham |
| 8,113,398 | B2 | 2/2012 | Sautter et al. |
| 8,136,708 | B2 | 3/2012 | Sautter et al. |
| 8,136,709 | B2 | 3/2012 | Jeli et al. |
| D656,887 | S | 4/2012 | Bogoslofski et al. |
| 8,196,789 | B2 | 6/2012 | Kraeuter et al. |
| 8,210,407 | B2 | 7/2012 | Sautter et al. |
| 8,235,267 | B2 | 8/2012 | Sautter et al. |
| 8,245,893 | B2 | 8/2012 | Sautter et al. |
| D669,017 | S | 10/2012 | Robertson |
| 8,333,311 | B2 | 12/2012 | Hubbard |
| 8,393,508 | B2 | 3/2013 | Sautter et al. |
| 8,408,853 | B2 | 4/2013 | Womack et al. |
| 8,505,793 | B2 | 8/2013 | Foley |
| 8,544,707 | B2 | 10/2013 | Hubbard |
| 8,668,181 | B2 | 3/2014 | Dazet et al. |
| D703,605 | S | 4/2014 | Sautter et al. |
| 8,763,870 | B2 | 7/2014 | Davis |
| D717,722 | S | 11/2014 | Cagampang et al. |
| 8,925,775 | B2 | 1/2015 | Sautter et al. |
| 9,102,274 | B2 | 8/2015 | Hubbard |
| 9,132,782 | B2 | 9/2015 | Hubbard |
| 9,409,527 | B2 | 8/2016 | Hubbard |
| 2001/0013528 | A1 | 8/2001 | Chimenti et al. |
| 2002/0053581 | A1 | 5/2002 | Peschmann et al. |
| 2002/0125282 | A1 | 9/2002 | Laverack et al. |

(56) References Cited

U.S. PATENT DOCUMENTS

| | | |
|---|---|---|
| 2003/0071097 A1 | 4/2003 | Dean |
| 2003/0164390 A1 | 9/2003 | Higginbotham, III |
| 2003/0178457 A1 | 9/2003 | Wang |
| 2003/0222112 A1 | 12/2003 | McLemore et al. |
| 2004/0118886 A1 | 6/2004 | Mirshafiee et al. |
| 2004/0211801 A1 | 10/2004 | Barbara |
| 2004/0238582 A1 | 12/2004 | Pedrini |
| 2005/0029320 A1 | 2/2005 | Chimenti et al. |
| 2005/0051585 A1 | 3/2005 | Kamiya et al. |
| 2005/0061842 A1 | 3/2005 | Tsai |
| 2005/0077335 A1 | 4/2005 | Bourne |
| 2005/0145639 A1 | 7/2005 | Viklund et al. |
| 2005/0205626 A1 | 9/2005 | Dean |
| 2005/0284905 A1 | 12/2005 | Naslund et al. |
| 2006/0000859 A1 | 1/2006 | Frischer |
| 2006/0029483 A1 | 2/2006 | Allen et al. |
| 2006/0049324 A1 | 3/2006 | Smith et al. |
| 2006/0060622 A1 | 3/2006 | Prenger |
| 2006/0086766 A1 | 4/2006 | Settelmayer |
| 2006/0208022 A1 | 9/2006 | Karlsson |
| 2006/0249466 A1 | 11/2006 | Wang |
| 2006/0273122 A1 | 12/2006 | Bogoslofski et al. |
| 2006/0273123 A1 | 12/2006 | Settelmayer |
| 2006/0273124 A1 | 12/2006 | Bogoslofski |
| 2006/0289577 A1 | 12/2006 | Malone |
| 2007/0036628 A1 | 2/2007 | Womack et al. |
| 2007/0108243 A1 | 5/2007 | Bingham |
| 2007/0119887 A1 | 5/2007 | Foley |
| 2007/0119888 A1 | 5/2007 | Chuang |
| 2007/0164065 A1 | 7/2007 | Davis |
| 2008/0000940 A1 | 1/2008 | Wang |
| 2008/0029563 A1 | 2/2008 | Malone |
| 2008/0053926 A1 | 3/2008 | Foley |
| 2008/0099522 A1 | 5/2008 | Clausen et al. |
| 2008/0101883 A1 | 5/2008 | Derecktor |
| 2008/0164292 A1 | 7/2008 | Farney |
| 2008/0193265 A1 | 8/2008 | Sautter et al. |
| 2008/0257924 A1 | 10/2008 | Kmita et al. |
| 2009/0014489 A1 | 1/2009 | Settelmayer et al. |
| 2009/0120984 A1 | 5/2009 | Sautter et al. |
| 2009/0159624 A1 | 6/2009 | Johnson et al. |
| 2009/0184189 A1 | 7/2009 | Soderberg et al. |
| 2009/0236382 A1 | 9/2009 | Sautter et al. |
| 2010/0078454 A1 | 4/2010 | Sautter et al. |
| 2010/0237116 A1 | 9/2010 | Hubbard |
| 2010/0282799 A1 | 11/2010 | Hubbard |
| 2010/0308091 A1 | 12/2010 | Hubbard |
| 2011/0132946 A1 | 6/2011 | Sautter et al. |
| 2011/0139838 A1 | 6/2011 | Sautter et al. |
| 2011/0139841 A1 | 6/2011 | Sautter et al. |
| 2011/0139842 A1 | 6/2011 | Sautter et al. |
| 2011/0174853 A1 | 7/2011 | Hubbard |
| 2011/0290836 A1 | 12/2011 | Shen |
| 2013/0020361 A1 | 1/2013 | Sautter et al. |
| 2013/0022440 A1 | 1/2013 | Sautter et al. |
| 2013/0037585 A1 | 2/2013 | Hubbard et al. |
| 2013/0062379 A1 | 3/2013 | Sautter et al. |
| 2013/0062383 A1 | 3/2013 | Jeli |
| 2013/0062385 A1 | 3/2013 | Pedrini |
| 2013/0175308 A1 | 7/2013 | Sautter et al. |
| 2013/0200121 A1 | 8/2013 | Hubbard |
| 2013/0214020 A1 | 8/2013 | Pedrini |
| 2013/0284779 A1 | 10/2013 | Sautter et al. |
| 2014/0028007 A1 | 1/2014 | Pfeiffer et al. |
| 2014/0097220 A1 | 4/2014 | Sautter et al. |
| 2014/0144958 A1 | 5/2014 | Sautter et al. |
| 2014/0144959 A1 | 5/2014 | Sautter et al. |
| 2014/0144960 A1 | 5/2014 | Condon et al. |
| 2014/0158728 A1 | 6/2014 | Sautter et al. |
| 2014/0158729 A1 | 6/2014 | Pedrini |
| 2014/0166709 A1 | 6/2014 | Hubbard |
| 2015/0069102 A1 | 3/2015 | Hubbard |
| 2015/0232038 A1 | 8/2015 | Robertson |
| 2015/0239402 A1 | 8/2015 | Hubbard |

FOREIGN PATENT DOCUMENTS

| | | |
|---|---|---|
| AU | 2008301329 B2 | 8/2012 |
| AU | 348922 | 5/2013 |
| AU | 2008304016 B2 | 1/2014 |
| CA | 971140 A | 7/1975 |
| CN | 87104266 A | 3/1988 |
| CN | 2445963 Y | 9/2001 |
| CN | 101559737 A | 10/2009 |
| CN | 101559738 A | 10/2009 |
| CN | 101868375 A | 10/2010 |
| CN | 201677818 U | 12/2010 |
| CN | 102177047 A | 9/2011 |
| CN | 101861257 B | 11/2012 |
| CN | 101868376 B | 3/2013 |
| CN | 102975661 A | 3/2013 |
| CN | 102177047 B | 2/2015 |
| DE | 2940095 A1 | 4/1981 |
| DE | 2950449 A1 | 6/1981 |
| DE | 3034226 A1 | 4/1982 |
| DE | 3201409 A1 | 9/1983 |
| DE | 3209912 A1 | 10/1983 |
| DE | 3614740 A1 | 11/1987 |
| DE | 3626479 A1 | 2/1988 |
| DE | 3637856 A1 | 5/1988 |
| DE | 8801618 U1 | 8/1988 |
| DE | 3912692 A1 | 11/1989 |
| DE | 4229268 A1 | 3/1994 |
| DE | 4423607 C1 | 6/1995 |
| DE | 20007760 U1 | 8/2000 |
| DE | 20309766 U1 | 9/2003 |
| DE | 202005007566 U1 | 7/2005 |
| EP | 0019873 B1 | 10/1982 |
| EP | 0151907 A2 | 8/1985 |
| EP | 0193501 A2 | 9/1986 |
| EP | 0433495 A1 | 12/1989 |
| EP | 0482650 A1 | 4/1992 |
| EP | 0504588 A1 | 9/1992 |
| EP | 0511179 A1 | 10/1992 |
| EP | 0646074 B1 | 10/1996 |
| EP | 0398885 B2 | 6/1997 |
| EP | 0869879 A | 10/1998 |
| EP | 0894672 A1 | 2/1999 |
| EP | 0945307 A2 | 9/1999 |
| EP | 0989029 A1 | 3/2000 |
| EP | 1285817 A2 | 2/2003 |
| EP | 1340652 A1 | 9/2003 |
| EP | 1340653 A2 | 9/2003 |
| EP | 1422940 A1 | 8/2004 |
| EP | 1205358 B1 | 7/2005 |
| EP | 1568542 A1 | 8/2005 |
| EP | 1712420 A1 | 10/2006 |
| EP | 2334514 A | 6/2011 |
| EP | 2437961 A | 2/2012 |
| EP | 2507095 A | 10/2012 |
| EP | 2303641 B1 | 11/2012 |
| EP | 002172445-0001 | 4/2013 |
| EP | 002231878-0001 | 7/2013 |
| EP | 002343582-0001 | 1/2014 |
| EP | 002343756-0001 | 1/2014 |
| EP | 2200869 B1 | 4/2014 |
| EP | 2200867 B1 | 6/2014 |
| EP | 2758275 A | 7/2014 |
| EP | 2200868 B1 | 8/2014 |
| FR | 1400231 A | 4/1965 |
| FR | 2481209 A1 | 10/1981 |
| FR | 2501601 A1 | 9/1982 |
| FR | 2519305 A1 | 7/1983 |
| FR | 2600953 A1 | 1/1988 |
| FR | 2624808 A2 | 6/1989 |
| FR | 2632595 A1 | 12/1989 |
| FR | 2711346 A1 | 4/1995 |
| FR | 2752793 A1 | 3/1998 |
| GB | 886743 A | 1/1962 |
| GB | 1045619 A | 10/1966 |
| GB | 1311367 A | 3/1973 |
| GB | 2257463 A | 1/1993 |
| GB | 2277309 A | 10/1994 |
| GB | 2303344 A | 2/1997 |

(56) References Cited

FOREIGN PATENT DOCUMENTS

| | | | |
|---|---|---|---|
| GB | 2475916 | A | 6/2011 |
| JP | 63-53143 | A | 3/1988 |
| JP | 9-20181 | A | 1/1997 |
| JP | 10-250488 | A | 9/1998 |
| JP | 2000-318538 | A | 11/2000 |
| MX | 2011012988 | A | 3/2012 |
| NZ | 551764 | A | 3/2009 |
| NZ | 561809 | A | 11/2009 |
| NZ | 561860 | A | 4/2010 |
| NZ | 561811 | A | 6/2010 |
| NZ | 571287 | A | 3/2011 |
| NZ | 592162 | A | 7/2012 |
| TW | 201111201 | A | 4/2011 |
| WO | 9110581 | A1 | 7/1991 |
| WO | 9202385 | A1 | 2/1992 |
| WO | 9410007 | A2 | 5/1994 |
| WO | 9624509 | A1 | 8/1996 |
| WO | 9638336 | A1 | 12/1996 |
| WO | 9702976 | A1 | 1/1997 |
| WO | 9708017 | A1 | 3/1997 |
| WO | 9810959 | A1 | 3/1998 |
| WO | 9954168 | A1 | 10/1999 |
| WO | 03006277 | A1 | 1/2003 |
| WO | 2005021332 | A1 | 3/2005 |
| WO | 2005102013 | A2 | 11/2005 |
| WO | 2009038479 | A1 | 3/2009 |
| WO | 2009038480 | A1 | 3/2009 |
| WO | 2009041828 | A1 | 4/2009 |
| WO | 2009158358 | A1 | 12/2009 |
| WO | 2009158360 | A1 | 12/2009 |
| WO | 2010030198 | A1 | 3/2010 |
| WO | 2010141944 | A1 | 12/2010 |
| WO | 2010144369 | A1 | 12/2010 |
| WO | 2010148011 | A1 | 12/2010 |
| WO | 2011084075 | A1 | 7/2011 |
| WO | 2013036939 | A1 | 3/2013 |
| WO | 2013040267 | A1 | 3/2013 |
| WO | 2013164692 | A2 | 11/2013 |
| WO | 2013165640 | A1 | 11/2013 |
| WO | 2014022435 | A1 | 2/2014 |

OTHER PUBLICATIONS

Roof Mounted Bike Racks sold by Bike Racks Plus. [Retrieved on Mar. 20, 2007]. © 2002-2005. Retrieved from the Internet <URL: http://www.bike-racks-plus.com/Roof_Mounted_Bike_Racks_y.htm>, 3 pages.

Rack Attack Portland's Blog, "Another hit from Yakima! The all new factory-compatible FrontLoader upright bike rack", Mar. 29, 2010, Retrieved from the Internet on Oct. 11, 2012, URL: http://rackattackportland.wordpress.com/2010/03/29another-hit-from-yakima-the-all-new-factory-compatible-frontloader-upright-bike-rack/, 3 pages.

Yakima FrontLoader upright bike rack review, Apr. 17, 2010, Retrieved from the Internet on Oct. 11, 2012, URL: http://carracks.blogspot.nl/2010/04/yakima-frontloader-upright-bike-rack.html, 2 pages.

ORS Racks direct.com, "Yakima FrontLoader Bike Rack Review Video by ORS Racks Direct", May 19, 2010, Retrieved from the Internet on Oct. 11, 2012, URL:http://www.youtube.com/watch?v=cu8rHM90Rdw, 9 pages.

Heinlen, Jerry, "Yakima FrontLoader Recall Information", Apr. 28, 2011, Retrieved from the Internet on Oct. 11, 2012, URL:http://firecall.yakima.com, 2 pages.

Yakima, "FrontLoader", Oct. 11, 2012, Retrieved from the Internet on Oct. 11, 2012, URL:http://yakima.com/shop/bike/roof/frontloader#pr-header-8002103, 5 pages.

* cited by examiner

CROSSBAR-TO-VEHICLE COUPLER

CROSS-REFERENCES

This application is based upon and claims the benefit under 35 U.S.C. § 119(e) of U.S. Provisional Patent Application Ser. No. 62/173,333, filed on Jun. 9, 2015, and U.S. Provisional Patent Application Ser. No. 62/175,192, filed on Jun. 12, 2015, which are incorporated herein, in their entireties, for all purposes.

The following related applications and materials are incorporated by reference, in their entireties, for all purposes: U.S. Pat. No. 6,905,053; U.S. Pat. No. 8,333,311; U.S. Pat. No. 8,393,508; U.S. Pat. No. 8,544,707; U.S. Pat. No. 9,132,782; U.S. patent application Ser. No. 15/167,774; U.S. patent application Ser. No. 15/172,043; and U.S. patent application Ser. No. 15/176,120.

FIELD

This disclosure relates to systems and methods for attaching cargo racks to vehicles. More specifically, the disclosed embodiments relate to crossbar-to-vehicle couplers having interchangeable crossbar clamps and a retractable-pin style of vehicle interface.

INTRODUCTION

Popularity of recreational activities continues to grow, with a corresponding growth in the need for carrying recreational equipment and cargo on vehicles. Accordingly, various equipment carriers and accessories have been developed over the years, for recreational items such as bicycles, skis, surf boards, standup paddle boards, kayaks, and the like. Many such carriers and accessories are supported on rooftop racks.

Meanwhile, the number of different vehicle rooftop configurations has grown as well, with various shapes, sizes, and features depending on the make and model of the vehicle. For example, rooftop rails may be flush on the roof, raised, or not present at all. Similarly, rooftops themselves may be relatively flat or curved, and a width of the roof may change from front to back.

Rooftop racks typically include crossbars mounted to the vehicle roof, and the crossbars themselves may be of various shapes and sizes, from square to round to aerodynamic.

With all this variation, rooftop rack systems must typically incorporate a myriad of components customized to fit each style of roof and rooftop feature. A need exists for a simplified system of crossbars, support towers, and connection features, with a reduction in customized components.

Furthermore, rooftop curvature and forward-aft angling of the rooftop surface is frequently non-horizontal. This results in less than adequate angling of the rack's crossbars, which ideally should be horizontal in all directions, or at some other desired angle relative to air flow and/or cargo carrying accessories.

SUMMARY

The present disclosure provides systems, apparatuses, and methods relating to crossbar-to-vehicle couplers for rooftop cargo racks.

In some embodiments, a rack for carrying cargo on top of a vehicle may include a crossbar and a coupler configured to mount an end portion of the crossbar on top of a vehicle, the coupler including a vehicle interface for releasably securing the coupler to the vehicle, the vehicle interface including: a base portion having one or more recesses and a fastening mechanism configured to affix the base portion to the vehicle, and a body portion having a pivotable cover operatively connected to one or more locking pins that move into engagement with the one or more recesses in the base portion when the cover moves from an open position to a closed position, and a crossbar interface for releasably securing the crossbar to the coupler, the crossbar interface including: a removable crossbar clamp having a crossbar seat and a crossbar connector configured to capture the crossbar and movable relative to the crossbar seat, and a crossbar clamp actuator operatively connected to the crossbar connector and configured to urge the crossbar connector downward, such that the crossbar is secured onto the crossbar seat.

In some embodiments, a rack for carrying cargo on top of a vehicle may include a crossbar having a long axis; and a coupler configured to mount an end portion of the crossbar on top of a vehicle, the coupler including a vehicle interface for releasably securing the coupler to the vehicle, the vehicle interface including: a base portion having one or more recesses and a fastening mechanism configured to affix the base portion to the vehicle, a body portion having a pivotable cover operatively connected to one or more locking pins that move into engagement with the one or more recesses in the base portion when the cover moves from an open position to a closed position, and a crossbar interface for releasably securing the crossbar to the coupler, the crossbar interface including: a crossbar clamp configured to engage the crossbar, and a crossbar clamp actuator operatively connected to the crossbar clamp, a clamp tightening screw of the crossbar clamp actuator having a length that is substantially parallel to the long axis of the crossbar.

In some embodiments, a method for attaching a crossbar to a vehicle may include connecting a crossbar clamp to a clamp actuator of a crossbar-to-vehicle coupler, the clamp actuator having a traveling wedge block operatively connected to a movable wedge follower, such that a first portion of the crossbar clamp is attached to and movable with the wedge follower; capturing a crossbar with the first portion of the crossbar clamp; clamping the crossbar to the coupler by repositioning the traveling wedge block in a first direction substantially parallel to a long axis of the crossbar across the movable wedge follower, such that the movable wedge follower is forced in a second direction, urging the first portion of the crossbar clamp into a clamping position; and attaching the coupler to a vehicle by pivoting a cover of the coupler from an open position to a closed position, such that one or more locking pins operatively connected to the cover engage with one or more recesses in a base portion fixed to the vehicle roof.

Features, functions, and advantages may be achieved independently in various embodiments of the present disclosure, or may be combined in yet other embodiments, further details of which can be seen with reference to the following description and drawings.

DESCRIPTION

Figure 1:
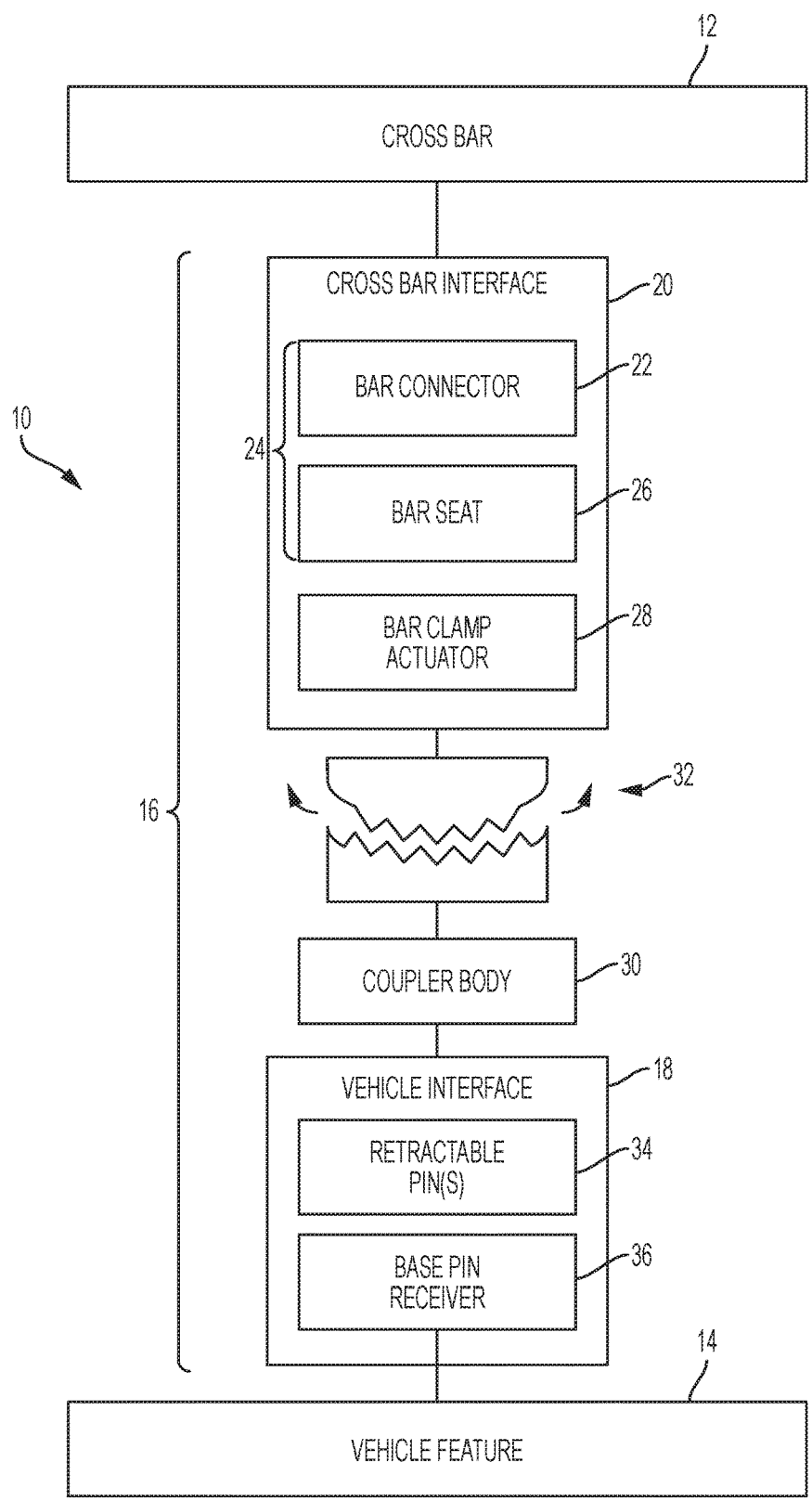
FIG. 1 is a schematic block diagram of a rooftop cargo rack system.

Various aspects and examples of a crossbar-to-vehicle coupler having a retractable-pin vehicle interface, as well as related systems and methods, are described below and illustrated in the associated drawings. Unless otherwise specified, a coupler according to the present teachings and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "inboard," "outboard," "forward," and "aft" (and the like) are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a crossbar may have a "forward" edge, based on the fact that the edge in question would be installed facing the front portion of a host vehicle.

The term "pitch" or "pitch angle" refers to the tilt of an object about a lateral or transverse axis, such that a positive pitch indicates a raised leading edge of the object and lowered trailing edge. Conversely, a negative pitch indicates a lowered leading edge and raised trailing edge. Pitch is a relative measurement of the tilt with respect to a given frame of reference (e.g., the ground, another object, arbitrarily defined reference axes, etc.). For example, object A could have a negative pitch with respect to object B, regardless of the two objects' orientations relative to another frame of reference.

The lateral axis of a crossbar is its long axis, because crossbars are typically mounted to extend across the lateral width of a vehicle. Accordingly, the pitch of a crossbar may refer to the tilt of the crossbar (about its long axis) relative to a coupler on which the crossbar is mounted, or to the underlying local surface of the vehicle rooftop. With this frame of reference, the crossbar may have a positive or negative pitch even if the crossbar is horizontal (i.e., zero pitch) with respect to the ground.

Overview of a Roof Rack System

In general, and with reference to FIG. 1, a vehicle roof rack system 10 may include any suitable combination of components configured to provide a selected crossbar securely affixed to a vehicle rooftop. The crossbar is supported at either end by a pair of supports having features that facilitate attachment to corresponding feature(s) on the specific vehicle. The crossbar supports may also be referred to as towers, feet, or mounts, and are referred to herein as couplers. A versatile and efficient system may be provided to fit a selected crossbar to the wide range of vehicle rooftops present in the marketplace.

Accordingly, roof rack system 10 may include one or more types of crossbars 12 suitable for use on a range of vehicles. Each type of crossbar 12 may include any suitable crossbar configured to be mounted transverse to the long axis of a vehicle, across a rooftop, and to support loads placed thereon. For example, a crossbar 12 may support a bicycle carrier, ski carrier, kayak carrier, and the like. Crossbars are typically mounted on a vehicle in pairs, such that a forward and an aft crossbar are present on the vehicle for proper load carrying. Crossbars 12 may have any suitable cross section, such as round, square, teardrop, aerodynamic, and/or any other suitable shape or combination of shapes. Specific embodiments of crossbars 12 are described in further detail below.

Crossbars 12 are supported by attaching or fastening each of the crossbars to one or more specific vehicle features 14. Vehicles come in many shapes and sizes, with a corresponding array of roof topologies. Vehicle features 14, to which the crossbars may be attached, can include raised rails running along lateral sides of a rooftop, flush rails with no space between the rails and the roof, channels or hard points on the roof, side edges or gutters of a naked roof, and/or the like.

To fasten the outboard ends of the crossbars to features 14, system 10 may include one or more couplers 16, also referred to as supports, towers, feet, or mounts, as mentioned above. Each coupler 16 may include any suitable vehicle interface 18 configured to attach, clamp, and/or removably connect to one or more vehicle features 14. Each coupler 16 may also include any suitable crossbar interface 20 configured to provide an attachment point or mount for a crossbar 12.

In some examples, crossbar interface 20 may include a universal interface for connecting a variety of crossbars. For example, crossbar interface 20 may include a threaded bolt protruding upward from support 16. Each specific crossbar 12 may include or be associated with a bar connector 22 (also referred to as an adapter) configured to provide a crossbar-specific bar clamp 24 when combined with a bar seat 26. In this example, bar connector 22 may include a threaded portion for receiving the threaded bolt, as well as a holder portion for gripping, grasping, or grabbing onto the specific crossbar.

Bar clamp 24 may be used to removably and securely attach crossbar 12 to coupler 16. For example, bar connector 22 may comprise a movable capturing portion configured to secure the crossbar against seat portion 26. Accordingly, crossbar interface 20 of coupler 16 includes a crossbar (or bar) clamp actuator 28 configured to tighten, draw together, or otherwise cause clamp 24 to securely engage the crossbar. Bar clamp actuator 28 may include a manual actuator or manual actuating mechanism. Illustrative examples of bar clamp actuators 28 are described in detail below.

Bar connector 22 and/or bar seat 26 may be grouped or provided with crossbar 12 to form a bar kit suitable for connecting to remaining elements of crossbar interface 20 of one or more different couplers 16. In other examples, bar connector 22 and/or bar seat 26 may be grouped or provided with coupler 16, to form a customized coupler suitable for connecting to a specific crossbar 12. From these examples, it should be clear that selected combinations of subcomponents of system 10 may be provided independently or separately, and combined or assembled as appropriate (e.g., for a specific vehicle).

In some examples, coupler 16 may include a body or body portion 30 providing structural and/or other functional aspects of the coupler, e.g., locking devices, environmental, aesthetic, and/or aerodynamic outer housing features, internal support structure, etc. Vehicle interface 18 and/or crossbar interface 20 may be attached, unitary with, and/or coupled to coupler body portion 30. Alternatively or additionally, crossbar interface 20 and vehicle interface 18 may be coupled to each other.

For some crossbars, the pitch of the crossbar should be selected to provide an optimal or otherwise desirable performance relative to air flow and/or cargo carrying features. For example, a crossbar may have a profile (i.e., the shape of a cross section taken perpendicular to the long axis of the bar) that is elongated or has one or more flattened surfaces. This may be the case, for example, for aerodynamic crossbars, oval crossbars, rectangular or square crossbars, etc. Accordingly, these types of crossbars have a preferred orientation (e.g., horizontal) in the forward-aft direction (e.g., the direction of vehicle travel or of expected air flow). However, vehicle rooftops frequently do not have the same desired forward-aft angle (e.g., horizontal). The local angle of the rooftop under any given coupler may be different, even within the same rooftop rack. Ensuring the crossbar pitch is substantially correct for various possible host vehicles would therefore require either a vast number of custom-angle couplers or some type of pitch adjustment mechanism that allows the user to select a suitable pitch angle. Accordingly, in some examples, coupler 16 may include a selectively orientable (e.g., pivotable) pitch adjustment interface 32. Interface 32 may be disposed between crossbar interface 20 and coupler body 30, or at any other suitable location. In some examples, pitch adjustment interface 32 includes a first mating surface of the crossbar clamp that is received on a complementary second mating surface of the coupler body. The first mating surface may be capable of a plurality of continuous or discrete orientations with respect to the second mating surface.

In some examples, pitch adjustment interface 32 may be a curved or stepwise-curved (e.g., faceted) interface connecting seat portion 26 to coupler body 30. The curved interface may include a pair of interlocking surfaces. The interlocking surfaces may include interlocking projections, such that the seat portion is selectively securable in a plurality of discrete orientations with respect to the coupler.

Because a function of the pitch adjustment interface is to adjust the angle of the crossbar, each of the discrete orientations may correspond to a respective angle of the crossbar relative to the coupler.

In addition to or instead of interlocking surfaces, pitch adjustment interface 32 may comprise a high-friction material. In examples where projections or other interlocking features are absent (e.g., a smoothly curved mating surfaces), the seat portion may be selectively securable in a range of continuously adjustable orientations with respect to the coupler. Examples of pitch adjustment interface 32 are described in further detail below.

Vehicle interface 18 may include any suitable structure and/or device configured to removably attach to a given vehicle feature (or features) 14. For example, vehicle interface 18 may include a clamp, hook, bolt, clip, strap, and/or the like, and/or any combination of these. To provide an efficient and versatile system, a selected number of vehicle interface types may be provided, some having modifiable or selectable components for further customization. In the example disclosed herein, vehicle interface 18 includes one or more retractable pins 34 and a corresponding base portion having a pin receiver 36. The base portion and pin receiver may be affixed to the vehicle, such that the remainder of coupler 16 may be engaged or disengaged using the retractable pins. Aspects of this style of vehicle interface and coupler are described further below.

Accordingly, system 10 may allow a user to choose a crossbar 12, select a coupler 16 having a vehicle interface 18 appropriate for attachment to vehicle feature 14 of the user's vehicle, and clamp the crossbar to the support using a corresponding bar connector 22 and bar seat 26.

Figure 2:
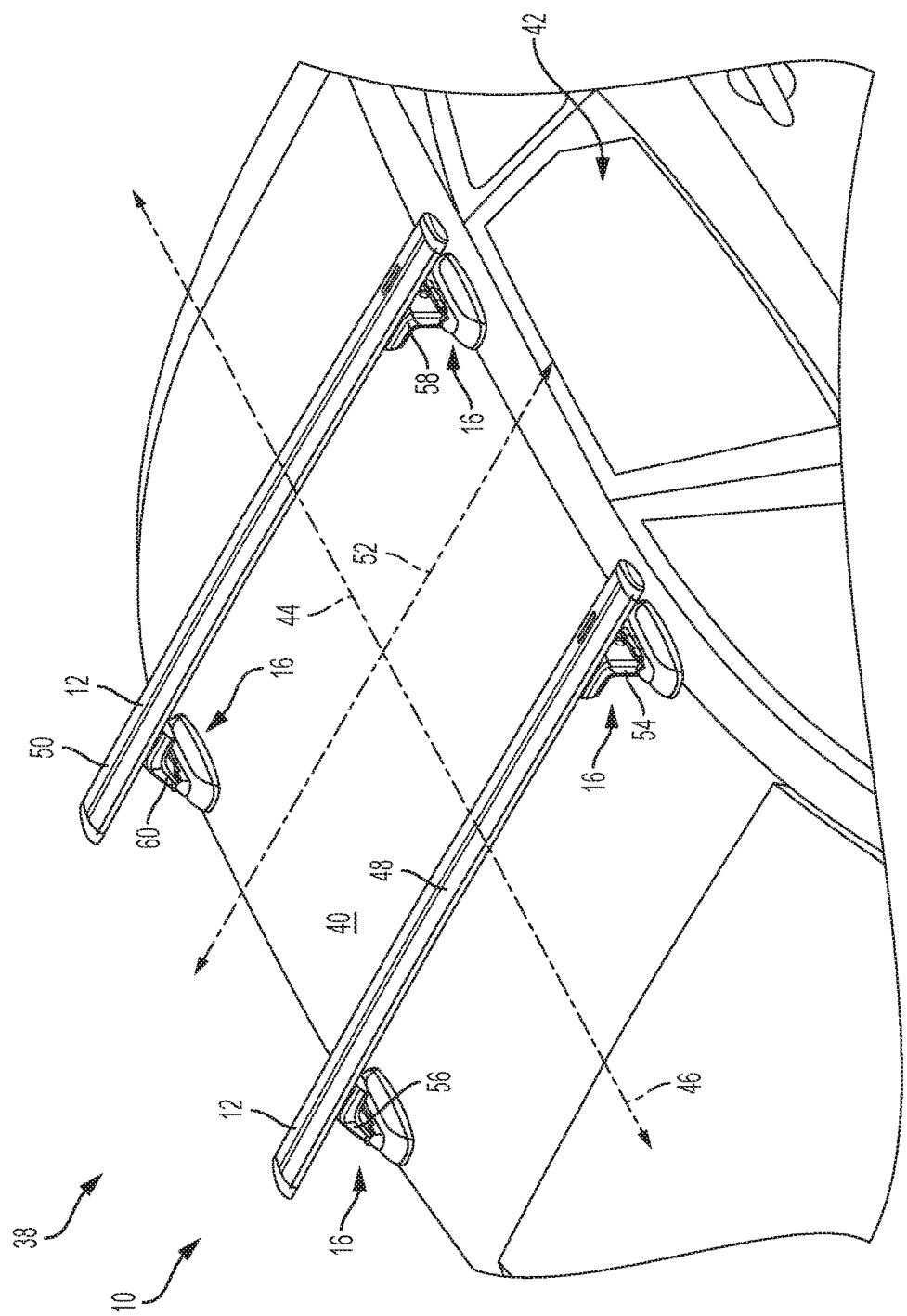
FIG. 2 is an oblique isometric view of a portion of an illustrative vehicle showing an illustrative rooftop rack mounted thereon.

Turning to FIG. 2, a specific example of a roof rack 38 is depicted, attached to an illustrative roof 40 of a vehicle 42. Roof rack 38 is a selected example of roof rack 10, described above. Accordingly, similar components may be labeled with similar reference numbers. Rack 38 may be used for carrying cargo and/or cargo-specific accessories on top of vehicle 42. Vehicle 42 has an longitudinal or central axis 44 generally coinciding with (e.g., running parallel to) a direction of vehicular travel 46.

Rack 38 includes a pair of slotted crossbars 48 and 50 having aerodynamic shapes and attached to vehicle roof 40. Each crossbar is supported and mounted on vehicle 38 by a respective pair of couplers configured to mount the crossbar on top of the vehicle with the crossbar substantially perpendicular to longitudinal axis 44. Accordingly, crossbars 48 and 50 are substantially parallel to each other and oriented across a width of the vehicle roof, as generally indicated by a lateral axis 52 in FIG. 2. Crossbar 48 is mounted on top of the vehicle by couplers 54 and 56, and crossbar 50 is mounted on top of the vehicle using couplers 58 and 60. In this example, couplers 54, 56, 58, 60 have a hard-mount style of vehicle interface configured to clamp onto fixed base portions attached to the vehicle roof. Other styles may be suitable, and other vehicle features may be present.

Figure 3:
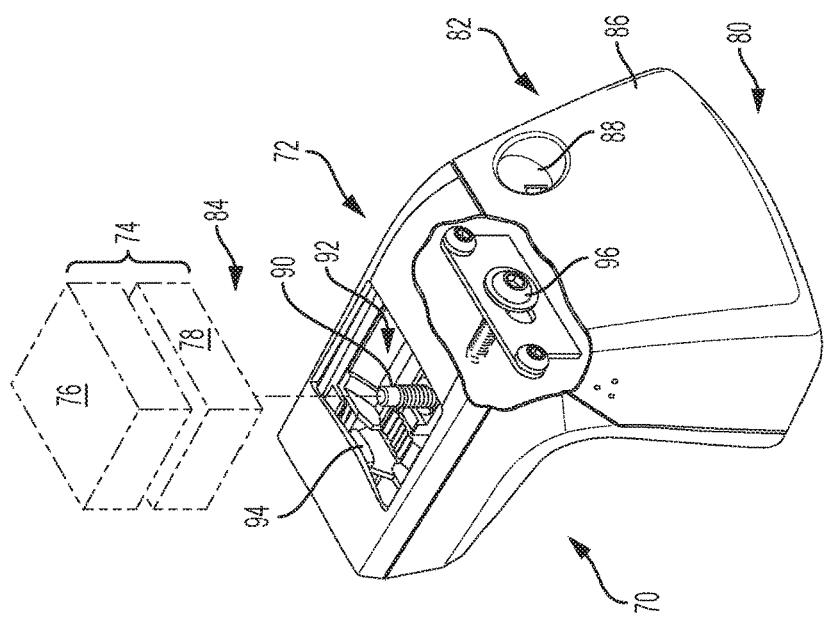
FIG. 3 is a partially schematic diagram of an illustrative crossbar-to-vehicle coupler in accordance with aspects of the present disclosure.

As shown in FIG. 3, this section describes an illustrative coupler 70 having a crossbar clamp actuator 72. Coupler 70 is an example of couplers 16 described above. Accordingly, similar components may be labeled with similar reference numbers.

FIG. 3 is an oblique isometric view from above the coupler, showing the interface provided by the coupler and clamp actuator. A bar clamp 74 is shown schematically, including a bar connector 76 and a bar seat 78, to illustrate that various such clamp components may be interchangeably utilized with clamp actuator 72. In similar fashion, clamp actuator 72 may be incorporated into various couplers. Accordingly, in some examples this type of clamp actuator may be referred to as a universal connector, or the like.

As described above, coupler 70 includes a vehicle interface portion 80, a body 82, and a crossbar interface portion 84. Coupler 70 includes an outer housing 86, which in this example includes a locking feature 88 configured to prevent unwanted access to internal components.

As indicated schematically in FIG. 3, crossbar clamp 74 is configured to be attachable to a threaded member 90 of clamp actuator 72. Any suitable clamp may be used. In the examples described below, a two-piece clamp is utilized, comprising bar seat 78 and bar connector 76. In those examples, bar seat 78 includes any suitable structure configured to support the crossbar and function as an anvil against which the bar is secured (i.e., clamped). In some examples, bar seat 78 includes a crossbar-facing surface (i.e., seat) that conforms to an expected shape of the crossbar. In some examples, bar seat 78 is configured to nest on, mount to, or mate with a supporting surface 92 of coupler 62 (e.g., as in pitch adjustment interface 32). One or more retaining features 94 of coupler 62 may be utilized (temporarily or otherwise) to hold bar seat 78 in place. Crossbar connector 76 may include any suitable structure configured to be securely attachable to coupler 70 (e.g., at threaded member 90) and to grab, connect with, encompass, slot into, engage, mate with, latch onto, or otherwise hold a portion of a crossbar. Crossbar connector 76 may be referred to as a movable capturing portion configured to secure the crossbar against the seat portion. In some examples, different crossbar connectors may be provided corresponding to respective different types of crossbars.

Clamp actuator 72 includes any suitable structure and/or mechanism manually or automatically operable to urge bar connector 76 into a clamping position relative to bar seat 78, such that the connector and the bar seat secure the crossbar when clamped. For example, a portion of the crossbar may be clamped between the connector and the bar seat. In some examples, the actuator may pull the bar connector downward such that the crossbar is pulled with the connector and secured onto the crossbar seat. In some examples, actuator 72 may cause a pinching action between the bar connector and the bar seat, securing a portion of the crossbar. Actuator 72 may be reversibly operable, such that the same actuator may be used to disengage the clamp from the crossbar. In some examples, actuator 72 may be used to actively or affirmatively urge connector 76 away from crossbar seat 78. In some examples, actuator 72 may be used to release a securing force or pressure, such that the connector and seat can be manually separated.

In addition to securing clamp 74 to coupler 70, threaded member 90 may form a part of actuator 72. For example, rotation of threaded member 90 may, alone or in combination with other features, result in a clamping action. However, clamp operation via manipulation of threaded member 90 alone may require continued access to threaded member 90, which may not be desirable and/or practical in all operational situations or configurations. Accordingly, in some examples, clamp 74 is attached to the coupler and/or actuator by member 90, and actuator 72 includes a separate and/or related actuation mechanism. For example, a tightening screw 96 may be operatively connected to threaded member 90, such that rotation of screw 96 causes threaded member 90 to move up and/or down to actuate clamp 74. As shown in FIG. 3, screw 96 may be horizontal and accessible from an outboard side of the coupler (e.g., after removing a panel or other portion of housing 86). A length of screw 96 may be oriented parallel to a long axis of the crossbar, i.e., transverse to the longitudinal axis of the vehicle.

EXAMPLES, COMPONENTS, AND ALTERNATIVES

The following sections describe selected aspects of exemplary crossbar-to-vehicle couplers, as well as related systems and/or methods. The examples in these sections are intended for illustration and should not be interpreted as limiting the entire scope of the present disclosure. Each section may include one or more distinct inventions, and/or contextual or related information, function, and/or structure.

Illustrative Crossbar Clamps

As shown in FIGS. 4-8, this section describes three examples of crossbar clamps. These crossbar clamps are each an example of crossbar clamps 24 and 74, described above. As such, corresponding components may be labeled and/or associated with the same or similar reference numbers.

Figure 4:
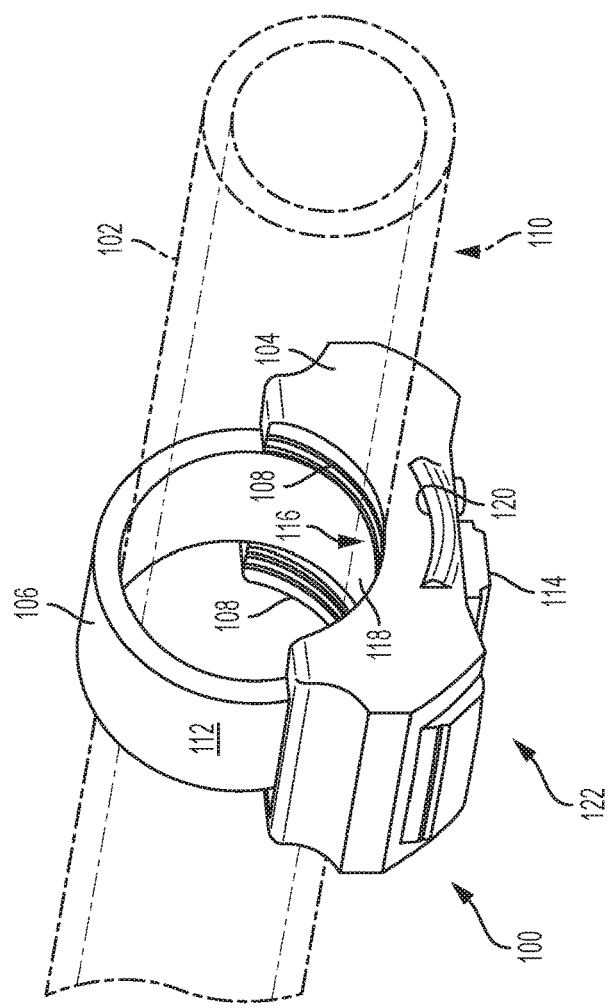
FIG. 4 is an isometric view of an illustrative crossbar clamp suitable for round crossbars.

FIG. 4 depicts an illustrative clamp 100 suitable for use with a substantially round crossbar 102. Clamp 100 includes a crossbar seat 104 and a crossbar connector 106. Crossbar seat 104 may include any suitable structure configured to cradle crossbar 102 on a seating surface 108 that generally conforms to an outer surface 110 of the crossbar. Crossbar seat 104 may be described as an anvil or a fixed jaw. In some examples, seating surface 108 may include a resilient, compressible, and/or compliant layer, such as a rubber coating, to reduce damage to crossbar 102.

Crossbar connector 106 may include any suitable structure configured to capture (e.g., grasp or grip) crossbar 102, and to be movable relative to crossbar seat 104, such that the captured crossbar can be urged or forced against seating surface 108. Crossbar connector 106 may be interchangeably referred to as a crossbar capturing member or crossbar capturing portion of clamp 100.

In this example, crossbar connector 106 includes a sleeve portion 112 and a stem portion 114. Sleeve portion 112 is a substantially cylindrical tube or collar generally conforming to but slightly larger than an outer diameter of the round crossbar. Sleeve portion 112 may freely slide on crossbar 102. Stem portion 114 extends or protrudes radially from an outer surface of sleeve portion 112. Stem portion 114 may include a fastening mechanism, such as a threaded hole, for attaching connector 106 to a clamp actuator.

Crossbar seat 104 includes a block having an aperture 116 running vertically through the block, and through which crossbar connector 106 can at least partially extend. For example, stem portion 114 may extend through aperture 116. In some examples, stem portion 114 may be connectible to an actuator, such that the actuator can pull crossbar connector 106 downward through aperture 116. As can be seen in FIG. 4, this action causes crossbar 102 to be pulled down onto crossbar seat 104, thereby arresting the downward motion of the crossbar connector and clamping the crossbar in place. As depicted in FIG. 4, a lower inner surface 118 of sleeve portion 112 may be pulled below seating surface 108. This may be facilitated by the larger diameter of sleeve portion 112 and/or an elastic deformation of sleeve portion 112 as a downward force is applied by the actuator. In some examples, crossbar 102 may be a steel crossbar and sleeve portion 112 may comprise aluminum.

Crossbar seat 104 also includes a retention ridge 120. A respective instance of ridge 120 may be present on one or more surfaces of seat 104, and may be configured to interface with a corresponding retaining feature, e.g., retaining feature 94 described above with respect to FIG. 3. For example, seat 104 may click into place with retaining feature 94 grabbing onto ridge 120 to hold the crossbar seat block in place on the coupler. Holding the crossbar seat in place may be temporary, as the crossbar seat is secured in place by subsequent clamping of the crossbar.

Crossbar seat 104 is supported on the coupler. Accordingly, a lower mating surface 122 may be shaped to engage or otherwise fit onto a corresponding support surface of the coupler (e.g., support surface 90 described above with respect to FIG. 3). As described below regarding similar crossbar seats, lower mating surface 122 may include one or more additional features, such as discrete positioning teeth, a selected curvature, etc.

Figure 6:
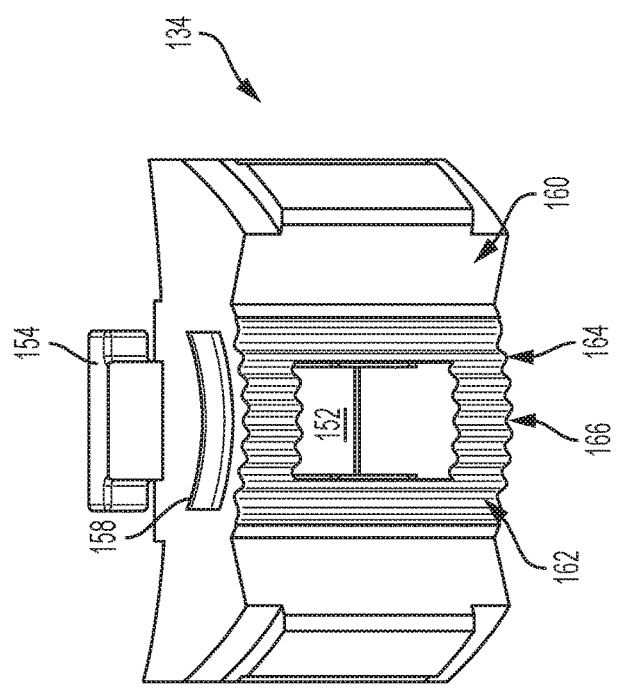
FIG. 6 is an isometric view of a crossbar seat portion of the crossbar clamp of FIG. 5, showing a ridged underside.
Figure 5:
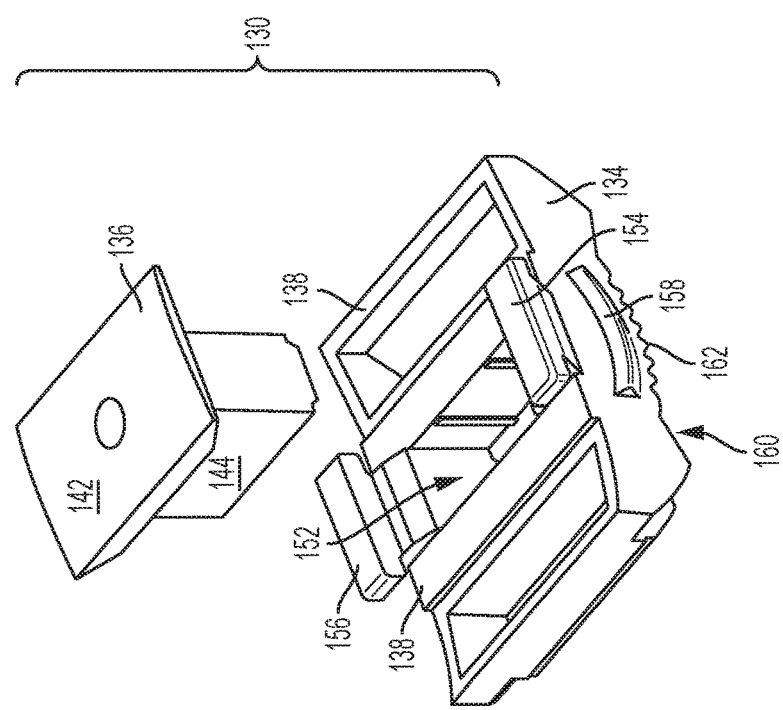
FIG. 5 is an isometric exploded view of another illustrative crossbar clamp suitable for slotted crossbars.
Figure 7:
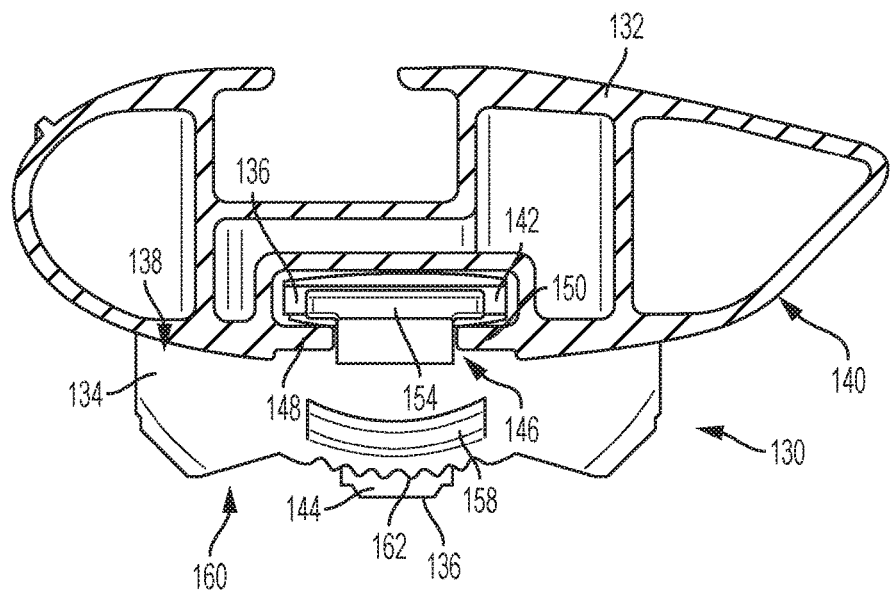
FIG. 7 is an end elevation view of the crossbar clamp of FIG. 5 assembled and installed in an illustrative slotted crossbar.

FIGS. 5-7 depict an illustrative crossbar clamp 130 suitable for use with a slotted crossbar 132. FIG. 5 is an exploded isometric view of clamp 130, FIG. 6 is a bottom oblique view of the crossbar seat portion of clamp 130, and FIG. 7 is an end view of clamp 130 assembled and inserted into a longitudinal bottom slot of crossbar 132, which is shown in section view.

Clamp 130 includes a crossbar seat 134 and a crossbar connector 136. Similar to crossbar seats 26 and 78, crossbar seat 134 may include any suitable structure configured to cradle crossbar 132 on a seating surface 138 that generally conforms to an outer surface 140 of the crossbar. Crossbar seat 134 may be described as an anvil. In some examples, seating surface 138 may include a resilient, compressible, and/or compliant layer, such as a rubber coating, to reduce damage to crossbar 132.

Crossbar connector 136 may include any suitable structure configured to capture (e.g., grasp or grip) crossbar 132, and to be movable relative to crossbar seat 134, such that the captured crossbar can be urged against seating surface 138. Crossbar connector 136 is an example of connectors 22 and 76, and may be interchangeably referred to as a crossbar capturing member or crossbar capturing portion of clamp 130. In this example, crossbar connector 136 may be referred to as a tee or a mushroom.

Crossbar connector 136 includes a flange portion 142, also referred to as a cap or tee portion, and a stem portion 144. Flange portion 142 is a substantially planar plate or flange sized to slide into a T-slot 146 (also referred to as a tee slot) of slotted crossbar 132. T-slot 146 runs longitudinally along a length of crossbar 132, and comprises a pair of lips 148 and 150 defining a gap (i.e., slot 146) therebetween. Flange portion 142 has a width that spans slot 146, such that bottom surfaces of the flange portion may abut upper surfaces of lips 148 and 150 of the tee slot. Stem portion 144 extends or protrudes orthogonally from flange portion 142. Stem portion 144 may be sized such that stem portion 144 can extend through slot 146 when flange portion 142 is inserted in the slot, as shown in FIG. 5. Accordingly, crossbar connector 136 may freely slide in a longitudinal direction along slot 146 of crossbar 132.

Stem portion 144 may include a fastening mechanism, such as a threaded hole, for attaching connector 136 to a clamp actuator. Inserting crossbar connector 136 into T-slot 146 effectively captures crossbar 132.

Crossbar seat 134 includes a block having a central aperture 152, through which crossbar connector 136 can at least partially extend. For example, stem portion 144 may extend through aperture 152, as shown in FIG. 6. In some examples, stem portion 144 may be connectible to an actuator, such that the actuator can pull crossbar connector 136 downward through aperture 152. As can be seen in FIG. 6, this action will cause flange 142 to exert force on lips 148 and 150, pulling crossbar 132 down onto crossbar seat 134, thereby arresting the downward motion of the crossbar connector and clamping the crossbar in place.

Crossbar seat 134 may include a pair of guide flanges 154 and 156 protruding from seating surface 138 on opposing sides of aperture 152. Guide flanges 154 and 156 may include any suitable structures axially aligned with each other and configured to mate in sliding engagement with crossbar slot 146. As with flange portion 142 of crossbar connector 136, guide flanges 154 and 156 may be passed into slot 146 through an end of the crossbar, in an axial direction with respect to the long axis of the crossbar. Guide flanges 154 and 156 are positioned on either end of flange portion 142 of the bar connector when assembled. Guide flanges 154 and 156 may be unitary with crossbar seat 134, and may function to maintain an orientation of the crossbar seat with respect to the crossbar slot, e.g., during assembly. Guide flanges 154 and 156 may not be load bearing structures. For example, clamping force may be applied to crossbar 132 by drawing bar connector 136 down onto crossbar seat 134. Flanges 154 and 156 are fixed relative to crossbar seat 134. Consequently, the guide flanges may not exert any substantive vertical force on the crossbar during a clamping operation.

Crossbar seat 134 also includes a retention ridge 158. A respective instance of ridge 158 may be present on one or more surfaces of seat 134, and may be configured to interface with a corresponding retaining feature of the coupler. For example, seat 134 may click into place with a retaining feature grabbing onto ridge 158 to hold the crossbar seat block in place on the coupler. Holding the crossbar seat in place may be temporary, as the crossbar seat is secured in place by subsequent clamping of the crossbar.

As best depicted in FIG. 6, a lower mating surface 160 may be shaped (e.g., curved) to engage or otherwise fit onto a corresponding (e.g., complementary) support surface of the coupler. Lower mating surface 160 may include one or more additional features, such as discrete positioning teeth 162 configured to mate with corresponding teeth or mating features on the support surface of the coupler. As shown in FIG. 6, teeth 162 may include lands 164 and grooves 166 oriented to be parallel to a long axis of the crossbar (e.g., ridges running in an outboard-inboard direction). Teeth 162 may extend across a length of the crossbar seat, and may be interrupted by aperture 152. A curved portion of lower mating surface 160 may be convex. Lower mating surface 160 may comprise a horizontal cylindrical segment 168.

Figure 8:
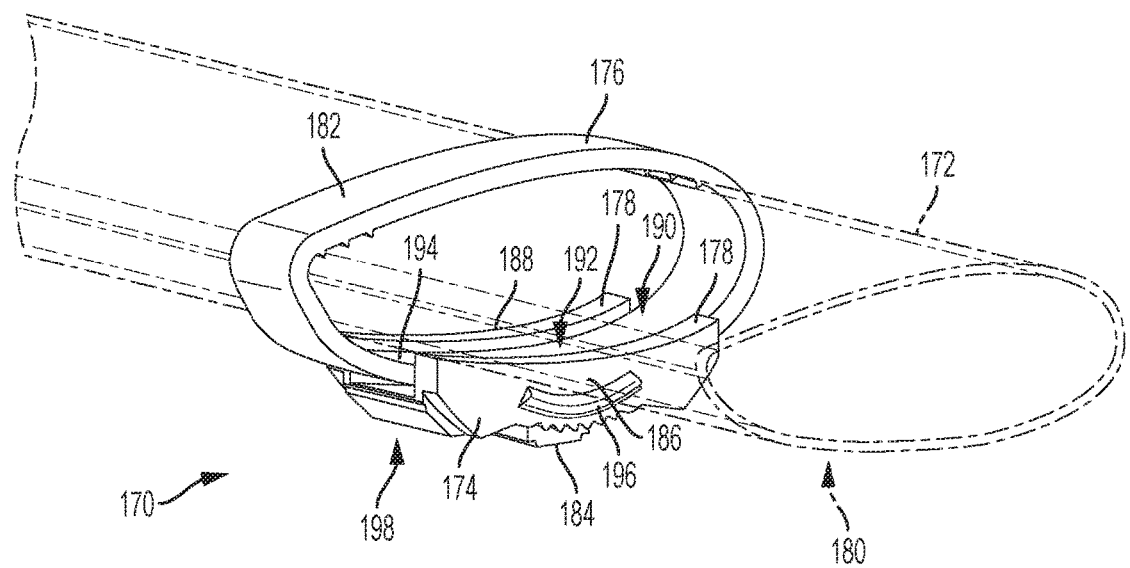
FIG. 8 is an isometric view of another illustrative crossbar clamp suitable for aerodynamically shaped crossbars.

FIG. 8 depicts another illustrative clamp 170 suitable for use with an aerodynamic (also referred to as "aero") or teardrop shaped crossbar 172. Aero crossbar 172 may or may not include a lower T-slot, similar to crossbar 132. However, crossbars having lower T-slots frequently also have such slots on upper surfaces, and clamp 170 may interfere with these upper slots. Accordingly, it may be desirable to use clamp 130 rather than clamp 170 in some examples.

Clamp 170 includes a crossbar seat 174 and a crossbar connector 176, both of which are similar to their corresponding components in clamp 100. Crossbar seat 174 may include any suitable structure configured to cradle crossbar 172 on a seating surface 178 that generally conforms to an outer surface 180 of the crossbar. Crossbar seat 174 may be described as an anvil. In some examples, seating surface 178 may include a resilient, compressible, and/or compliant layer, such as a rubber coating, to reduce damage to crossbar 172.

Crossbar connector 176 may include any suitable structure configured to capture (e.g., grasp or grip) crossbar 172, and to be movable relative to crossbar seat 174, such that the captured crossbar can be urged against seating surface 178. Crossbar connector 176 may be interchangeably referred to as a crossbar capturing member or crossbar capturing portion of clamp 170.

In this example, crossbar connector 176 includes a sleeve portion 182 and a stem portion 184. Sleeve portion 182 is a substantially teardrop-shaped or oval tube or collar generally conforming to but slightly larger than an outer shape of the aero crossbar. Sleeve portion 182 may freely slide on crossbar 172. Stem portion 184 extends or protrudes outward from an outer surface of sleeve portion 182. Stem portion 184 may include a fastening mechanism, such as a threaded hole, for attaching connector 176 to a clamp actuator.

Seating surface 178 of crossbar seat 174 may include two raised wall portions 186, 188 defining a central channel 190 having a central aperture 192. Crossbar connector 176 can at least partially extend through aperture 192, and sleeve 182 may be nestable in channel 190, as shown in FIG. 8. Stem portion 184 may extend through aperture 192 when clamp 170 is assembled.

In some examples, stem portion 184 may be connectible to an actuator, such that the actuator can pull crossbar connector 176 downward through aperture 192. As can be seen in FIG. 8, this action will cause crossbar 172 to be pulled down onto crossbar seat 174, thereby arresting the downward motion of the crossbar connector and clamping the crossbar in place. As depicted in FIG. 8, a lower inner surface 194 of sleeve portion 182 may be pulled below seating surface 178. This may be facilitated by the larger diameter of sleeve portion 182 and/or an elastic deformation of sleeve portion 182 as a downward force is applied by the actuator. In some examples, crossbar 172 may be a steel crossbar and sleeve portion 182 may comprise aluminum.

Crossbar seat 174 also includes a retention ridge 196. A respective instance of ridge 196 may be present on one or more surfaces of seat 174, and may be configured to interface with a corresponding retaining feature, e.g., retaining feature 94 described above with respect to FIG. 4. For example, as with other crossbar seats, seat 174 may click into place with retaining feature 94 grabbing onto ridge 196 to hold the crossbar seat block in place on the coupler. Holding the crossbar seat in place may be temporary, as the crossbar seat is secured in place by subsequent clamping of the crossbar.

A lower mating surface 198 may be shaped to engage or otherwise fit onto a corresponding (e.g., complementary) support surface of the coupler (e.g., support surface 90 described above with respect to FIG. 3). Lower mating surface 198 may be substantially identical to lower mating surface 160, as described above, including discrete positioning teeth, a selected curvature, etc. Lower mating surfaces of various clamps (e.g., clamps 130 and 170) may be substantially identical, facilitating the use of different clamps on any suitable coupler.

Illustrative Crossbar-to-Vehicle Coupler

As shown in FIGS. 9-12, this section describes an illustrative crossbar-to-vehicle coupler 200 having adjustable pitch and a retractable-pin style of vehicle interface. Coupler 200 is an example of couplers 16, 50, 52, 54, 56, and 70, described above. Accordingly, similar components may be labeled with similar reference numbers.

Figure 9:
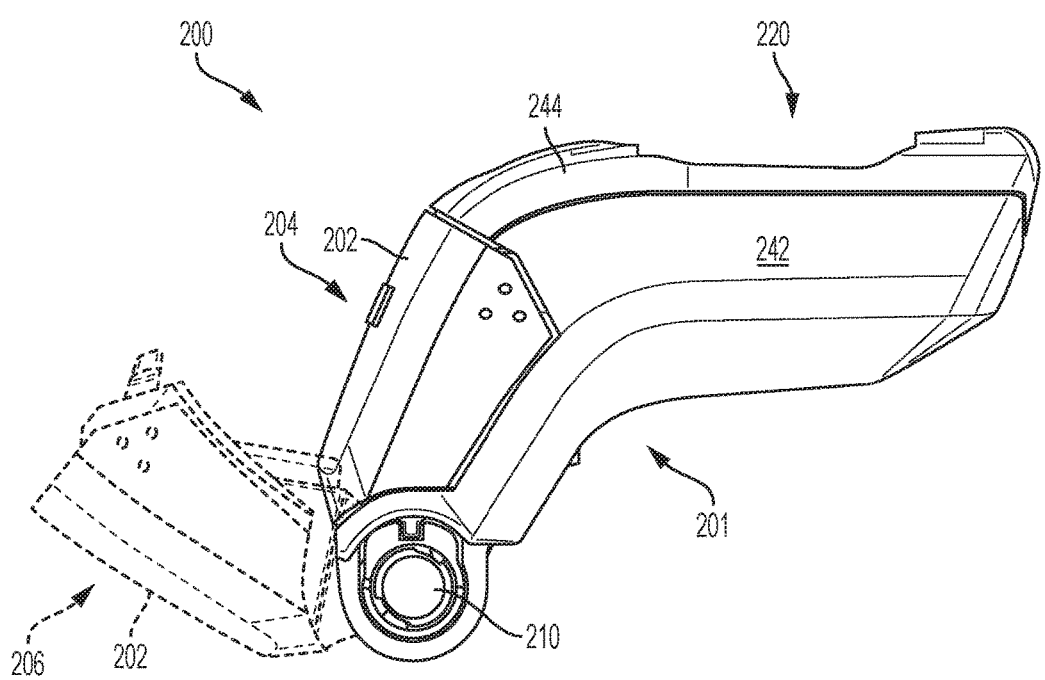
FIG. 9 is a side view of an illustrative crossbar-to-vehicle coupler showing different positions of a pivotable cover portion of the coupler.
Figure 10:
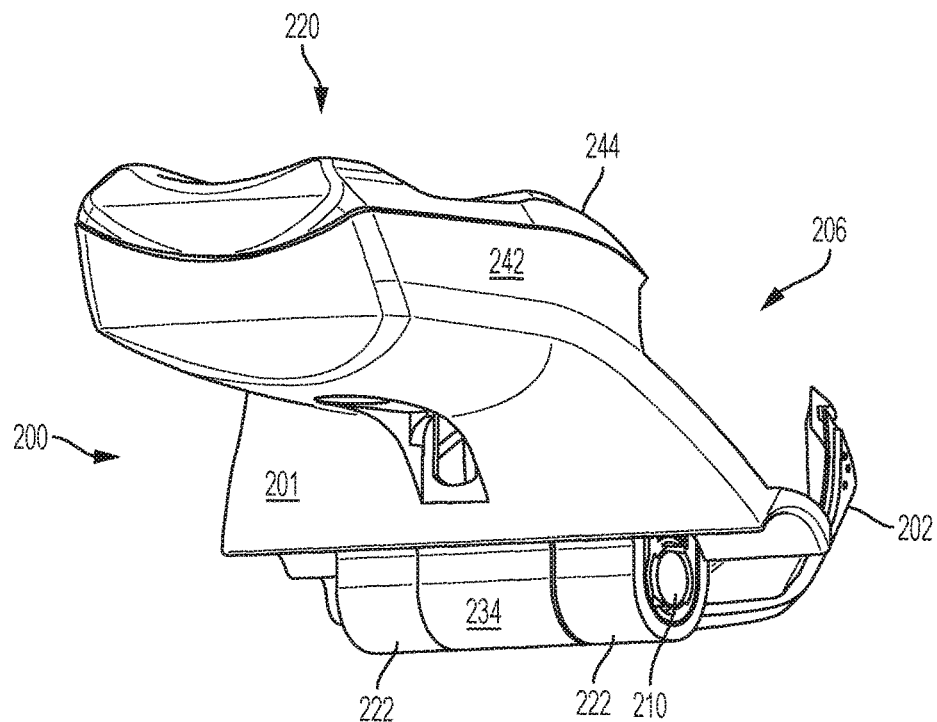
FIG. 10 is an isometric view of the coupler of FIG. 9, with the cover portion open and locking pins in a retracted position.
Figure 11:
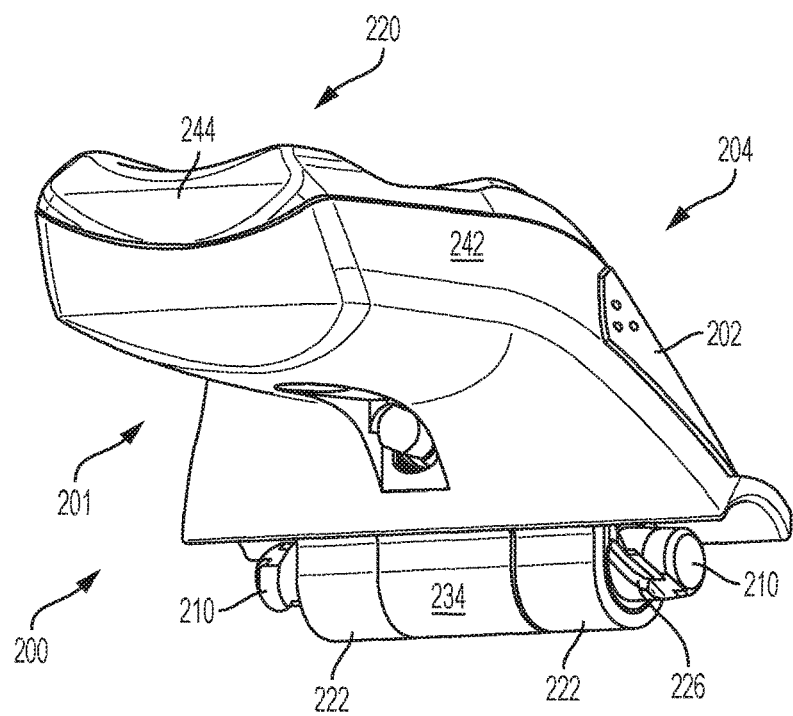
FIG. 11 is an isometric view of the coupler of FIG. 9, with the cover portion closed and the locking pins in an extended position.
Figure 12:
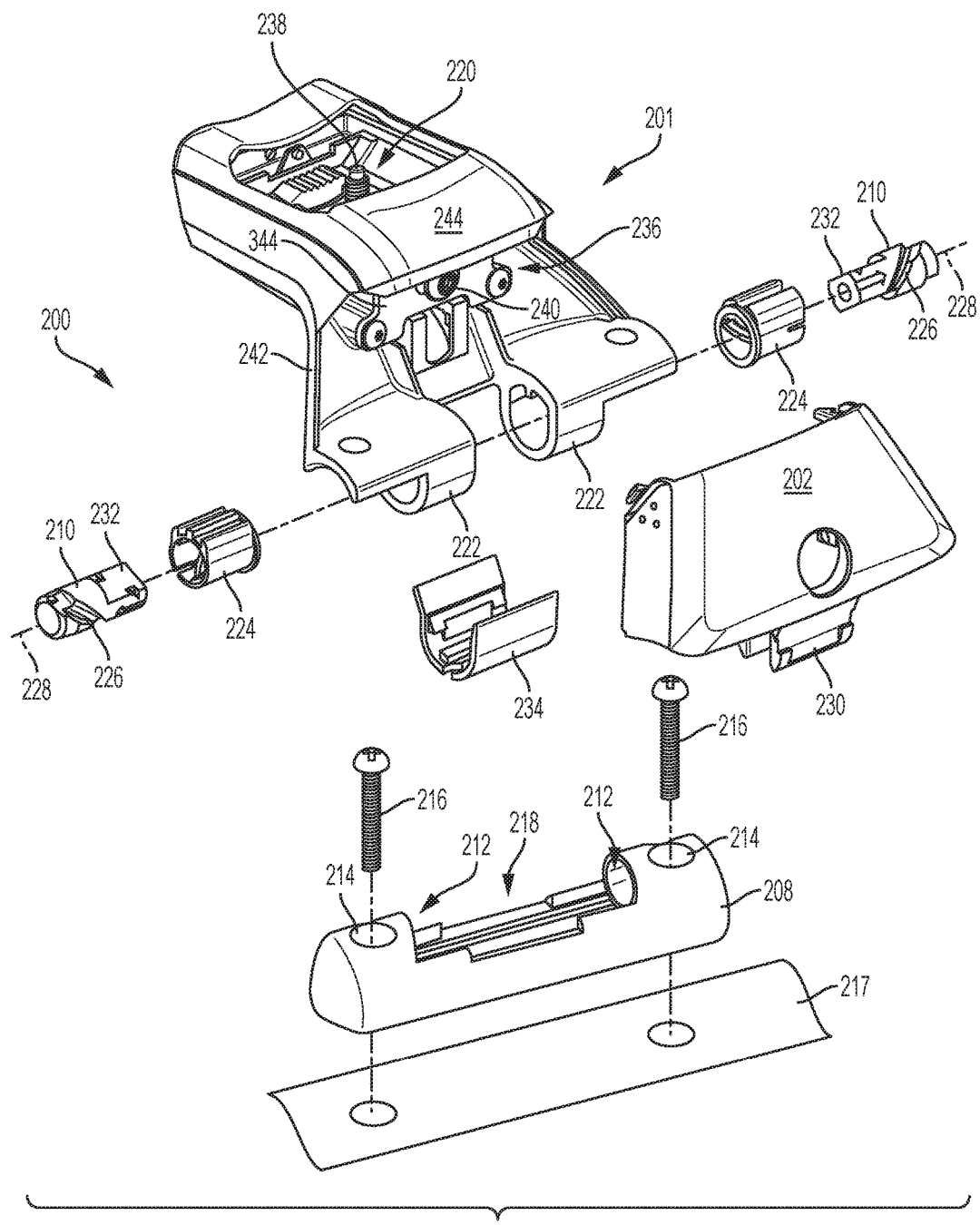
FIG. 12 is a partially exploded isometric view of the coupler of FIG. 9.

FIG. 9 is a side elevation view of a body portion 201 of coupler 200, showing a cover 202 (also referred to as a cover portion, a door, or a door portion) in a closed configuration 204 (solid lines) and a pivoted open position 206 (dashed lines). FIG. 10 is an oblique isometric view of the body portion of coupler 200 in configuration 206, and FIG. 11 is the same view of coupler 200, but in configuration 204. FIG. 12 is a partially exploded view of coupler 200, showing body portion 201 and a corresponding base portion 208 to which the body can be clamped.

As shown in FIG. 2, coupler 200 may include base portion 208, which is secured to a vehicle rooftop, e.g., directly or via a corresponding rail used for this purpose. Body 201 of coupler 200 is then releasably attachable to the base portion using a set of retractable pins 210, also referred to as locking pins. Pins 210 are configured to mate with a set of recesses 212 in base portion 208 to secure the coupler to the base portion.

As depicted in FIGS. 10 and 11, locking pins 208 may be extended and retracted using cover 202. Pivoting the cover open causes the pins to retract, and pivoting the cover closed causes the pins to extend. Accordingly, the coupler body can be disengaged from the base by opening the cover, and secured to the base by closing the cover.

With continuing reference to FIGS. 9-11, FIG. 12 shows the construction of coupler 200 in more detail. Base 208 includes one or more bolt holes 214 (two are shown) configured to accept a pair of screws or bolts 216 to secure the base to the vehicle roof, or in some examples to connectors disposed within a slotted roof rail, for example, 217 in FIG. 12. Base 208 also includes an inner surface 218 against which coupler body 201 may rest when coupled to base 208. Inner surface 218 may be configured to have a shape complementary to the shape of the bottom surface of body portion 201. In the depicted embodiment, inner surface 218 has a continuously curved shape that allows the body to pivot relative to the base, around an axis substantially perpendicular to the long axis of the crossbar. This pivoting allows one end of an attached crossbar to be lifted without causing damage at the other end of the crossbar to components or the vehicle, and allows the crossbar to be more easily adapted for use on roofs of different profiles. Inner surface 218 may have any other suitable shape without departing from the scope of the present disclosure.

The disclosed coupler embodiment may be modified to mount by fixed point attachment to many different vehicle roof configurations. For example, a coupler body may be screwed directly into factory provided holes in the vehicle roof. Factory holes may be protected by a cover when the holes are not being used to secure crossbars on the vehicle roof. Alternatively, holes may be created for coupler attachment at the time of installing the rack. The base may also be screwed into a side of a factory installed flush rail, or any other type of fixed point roof feature.

As mentioned above, base 208 also includes recesses 212, shown here as a pair of such recesses. Recesses 212 are configured to receive the complementary locking pins 210, which are movably coupled to body 201 of the coupler. Specifically, locking pins 210 are movable between a retracted position (or configuration), in which the locking pins do not extend into recesses 212, and an extended position (or configuration), in which the locking pins do extend into the recesses. This allows body 201 to be mounted to base 208 simply by resting the tower portion against inner surface 218 of base 208, and then moving locking pins 210 into recesses 212 (e.g., by closing cover 202).

Similarly, body 201 may be removed from base 208 simply by moving locking pins 210 out of recesses 212 (e.g., by opening cover 202), and then removing the body portion from the base. The operation of locking pins 210 is described in more detail below.

As described elsewhere in this disclosure, coupler 200 includes a crossbar interface 220 for supporting and securing a crossbar. Crossbar interface 220 is an example of crossbar interface 20 and includes a crossbar clamp (not shown in FIGS. 9-12) connected to an actuator (e.g., actuator 28). The crossbar clamp may be selected from a plurality of suitable crossbar clamps, including clamps 100, 130, 170 described above. A crossbar clamp may be selected based on the style of crossbar being supported by the coupler, e.g., round bar 102, slotted bar 132, or aero bar 172.

Body 201 of coupler 200 also includes a pair of generally cylindrical locking pin mounts 222, also referred to as pin housings. Locking pin mounts 222 have a generally curved outer shape that is complementary to the shape of inner surface 218 of base 208, to facilitate the pivoting of the coupler body on the base. However, the locking pin mounts may have any other suitable shape without departing from the scope of the present disclosure.

Locking pin mounts 222 are each configured to hold a locking pin sleeve 224 firmly in position relative to body 201. Each locking pin sleeve 224 has a threaded inner surface that is complementary to threads 226 formed in and/or on each locking pin 210. The interaction of threads 226 on locking pins 210 with the threads on the inner surfaces of locking pin sleeves 224 causes locking pins 210 to move linearly along their coaxial axis of rotation 228 relative to locking pin sleeves 224 when the locking pins are rotated. Accordingly, locking pins 210 can be made to retract into or extend out of locking pin sleeves 224 by rotating the locking pins with respect to the locking pin sleeves.

Rotation of locking pins 210 may be accomplished by causing locking pins 210 to rotate with movements of cover 202, as described above and shown in FIGS. 9-11. To accomplish this, cover 202 includes a downwardly extending locking pin bracket 230. Locking pin bracket 230 is configured to accommodate a flattened (or otherwise shaped) portion 232 at the end of each locking pin 210. Locking pin bracket 230 is also configured to allow locking pins 210 to slide linearly along the inner surfaces of the bracket, but not to rotate with respect to the bracket.

A bracket cover 234 configured to snap onto the bracket may be used to retain ends 232 of locking pins 210 within the bracket. Bracket cover 234 may include a lower surface complementary in shape to the inner surface of base 208. This, combined with the ability of locking pins 210 to rotate within locking pin sleeves 224, allows cover 202 to be pivoted between an open position and a closed position with respect to the remainder of the body. Cover 202 pivots along an axis of rotation that extends generally through (i.e., is coaxial with) both locking pins 210.

When cover 202 is in closed configuration 204, locking pins 210 are in the extended position, and extend into recesses 212 in base 208. As cover 202 is pivoted away from body 201 into open configuration 206, bracket 230 causes locking pins 210 to rotate along with the cover. The threads within locking pin sleeves 224 then cause locking pins 210 to retract into the sleeves as the locking pins rotate. Locking pins 210 may retract completely into locking pin sleeves 224 when cover 202 is opened. This disengages the body portion from the base, and allows body 201 to be easily removed from base 208. Likewise, body 201 may be engaged with or clamped to base 208 simply by placing pin mounts 222 onto inner surface 218 of base 208 while cover 202 is in the open position, and then pivoting the cover to the closed position.

As described in further detail below, coupler 200 includes an actuator 236 configured to attach to a crossbar clamp and apply a downward force on the clamp's crossbar connector. To this end, actuator 236 includes a clamp attachment bolt 238 and a clamp tightening screw 240. In this example, a length of tightening screw 240 extends horizontally in the inboard-outboard direction. Rotation of the tightening screw is converted to substantially vertical motion of the clamp attachment bolt 238 using a mechanism described in detail below, with respect to FIGS. 13-20.

In addition to providing for the quick attachment of body 201 to base 208, the use of cover 202 offers other advantages over conventional crossbar-to-vehicle couplers. For example, cover 202 covers much of the hardware used to mount and adjust coupler 200 when in the closed position. Thus, mounting bolts 216 and actuator tightening screw 240 are securable from unwanted access, and protected from contamination by road dust and dirt when cover 202 is closed. This may keep the system operating smoothly for a longer period of time as compared to unprotected components.

Body portion 201 of coupler 200 may include a rigid, structural frame 242 and a durable, resilient upper cap 244. Frame 242 may comprise a strong material, e.g., steel, for supporting loads attached to the coupler. Cap 244 may comprise a softer, cushioning material, e.g., rubber, for sealing, cushioning, and/or generally conforming to a supported crossbar.

Crossbar Clamp Actuator and Illustrative Actuation

As shown in FIGS. 13-19, this section describes the structure and operation of crossbar clamp actuator 236 (also referred to as an actuator mechanism or actuator assembly) in more detail. The clamp actuator described in this section is an example of crossbar clamp actuator 28, described above, and is similar to actuator 72 shown in FIG. 3. As such, corresponding components may be labeled and/or associated with the same or similar reference numbers.

As described above, actuation of crossbar clamps such as clamps 100, 130, and 170 includes repositioning of a portion of the clamp (e.g., a clamp jaw or crossbar connector) in a substantially downward direction, e.g., along a vertical path. For example, clamp 100 is actuated by applying a downward force to (e.g., pulling downward on) stem portion 114, thereby drawing bar connector 106 down with respect to bar seat 104. Because crossbar 102 is captured by the encircling bar connector 106, crossbar 102 is pinned against bar seat 104 as a result. Similarly, clamp 130 is actuated by applying a downward force to stem portion 144, thereby drawing bar connector 136 down with respect to bar seat 134. Because crossbar 132 is captured by bar connector 136 being inserted in slot 146, crossbar 132 is pinned against bar seat 134 as a result. This downward-force style of actuation may also be true for other types of clamps.

Accordingly, in these examples, a suitable actuator should provide a downward force to the crossbar connector portion of the crossbar clamps. Furthermore, it may be advantageous for a manual actuator to be accessible from an outboard side of the coupler, such that a user may operate the actuator easily when the coupler is mounted on a vehicle. Such a crossbar clamp actuator is described below, in which manipulation of a horizontal tightening member is mechanically translated into a downward clamping action.

Figure 13:
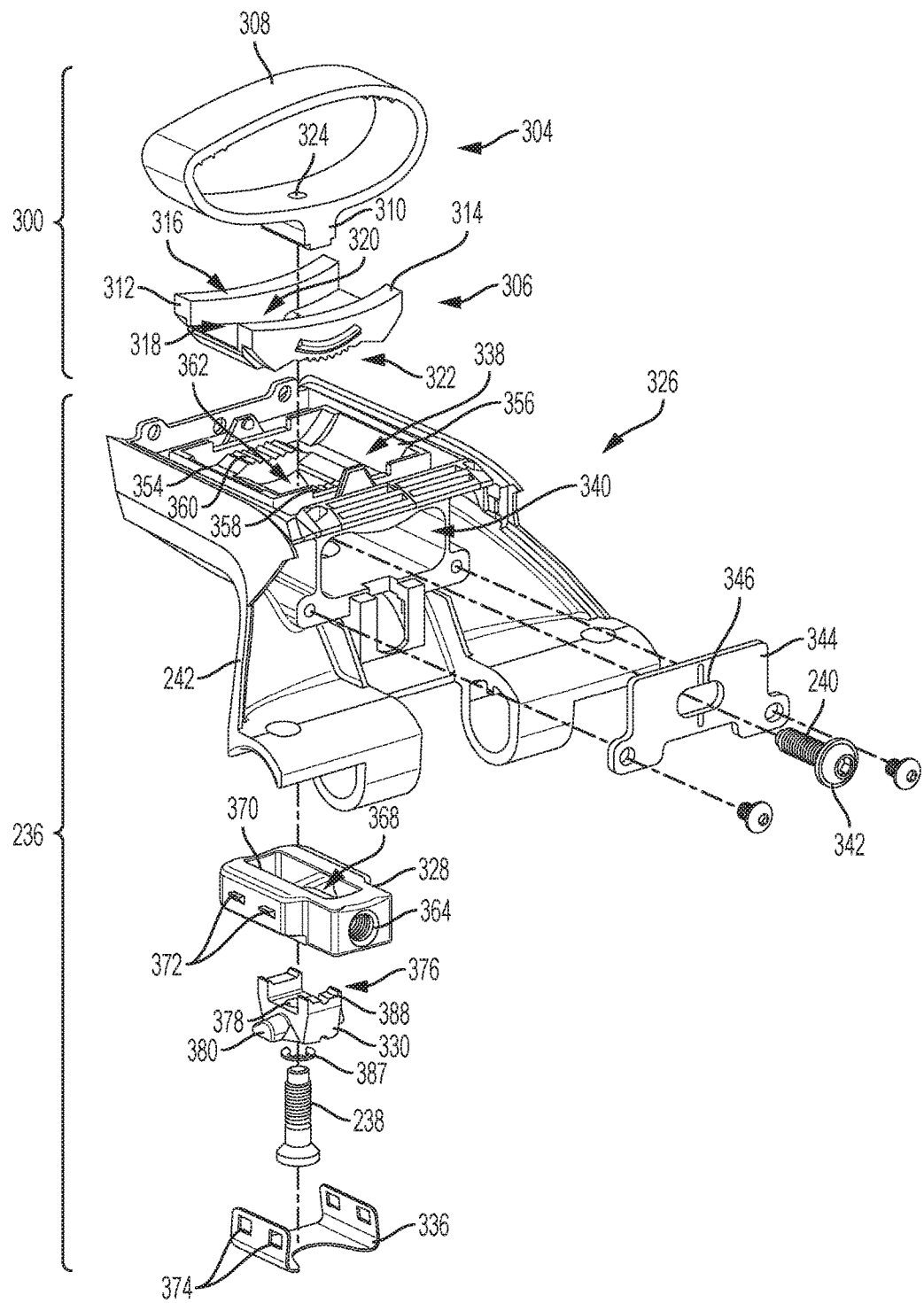
FIG. 13 is an exploded isometric view of an actuator assembly of the coupler of FIG. 9 and an illustrative crossbar clamp.

In FIG. 13, crossbar clamp actuator 236 and a selected crossbar clamp 300 are depicted in an exploded view. Any suitable crossbar clamp, such as the ones described above, may be used with actuator 236, and therefore with coupler 200. For example, crossbar clamp 130 is shown attached to actuator 236 in FIGS. 18, 19, and 22-27.

In this example, crossbar clamp 300 is substantially identical to crossbar clamp 170, and includes a crossbar connector 304 and a crossbar seat 306. Crossbar connector 304 is a collar-type connector having a sleeve portion 308 and a stem portion 310. Crossbar seat 306 includes a pair of side walls 312 and 314 defining a seating surface 316 for an aero crossbar (not pictured), a central channel 318, and an aperture 320. A rounded lower surface of the crossbar seat includes positioning teeth 322 for positively locating the crossbar seat on the housing described below.

Stem portion 310 of the crossbar connector includes a threaded hole 324 passing vertically through the stem. Stem portions of other crossbar clamps may include similar threaded holes, which may or may not pass completely through the stem. These threaded holes may be used to fasten a selected clamp to the attachment bolt of the actuator (see below), which corresponds to threaded member 90 of FIG. 3. Stem portion 310 may have a shaped lower profile. In this example, the lower profile is stepped or keyed to provide a mating surface for the wedge follower described further below.

As shown in FIG. 13, actuator 236 (also called an actuator assembly) includes a housing 326, a traveling wedge block 328 (also called a slide wedge or wedge portion), a wedge follower 330 (also called a slide follower), the aforementioned attachment bolt 238 (also called a second threaded member) and tightening screw 240 (also called a first threaded member), and a security cover 336.

Housing 326 may include any suitable structure(s) configured to provide a support surface 338 for crossbar seat 306, to define a cavity 340 for housing wedge block 328 and wedge follower 330, and to provide a stationary fulcrum or brace against which the mover of the wedge block can apply force. In this example, the mover of the wedge block is tightening screw 240. Accordingly, a head 342 of the tightening screw abuts and turns against a substantially vertical plate 344 (i.e., a wall) of housing 326, which provides a stationary structural abutment. The tightening screw passes through a hole 346 in the plate. Hole 346 may be elongated and/or arcuate, facilitating side to side adjustment within the hole and/or minor rotation/tilting of traveling wedge block 328 with respect to the rest of housing 326. A washer may be disposed between head 342 and plate 344. In other examples, the mover of the traveling wedge block may include a cam mechanism, a lever, and/or the like.

In this example, housing 326 includes a unitary, box-like, structural portion of frame 242 of body 201. Accordingly, housing 326 is integrated into coupler 200. In some examples, housing 326 comprises separate components attached to each other and/or to other features of the host coupler. For example, rather than an integral portion of the housing, plate 344 may comprise a separate component held in place by bolts or screws 348, as shown in FIG. 13.

Support surface 338, which comprises an upper portion of housing 326, may have any suitable structures configured to mate with and/or support crossbar seat 306 thereon, for example in a selected orientation. In this example, support surface 338 includes features that conform to corresponding features of the crossbar seat. For example, raised edges 354 and 356 are configured to positively locate and cradle the general shape of seat 306, and teeth 358 and 360 are configured to mate with teeth 322 to hold the crossbar seat in position. Support surface 338 further includes an aperture 362. In this example, aperture 362 in the housing is generally rectangular and corresponds positionally to aperture 320 of the crossbar seat. This positional correspondence allows, e.g., stem 310 of the crossbar connector to pass through the two aligned apertures when the components are assembled.

Figure 14:
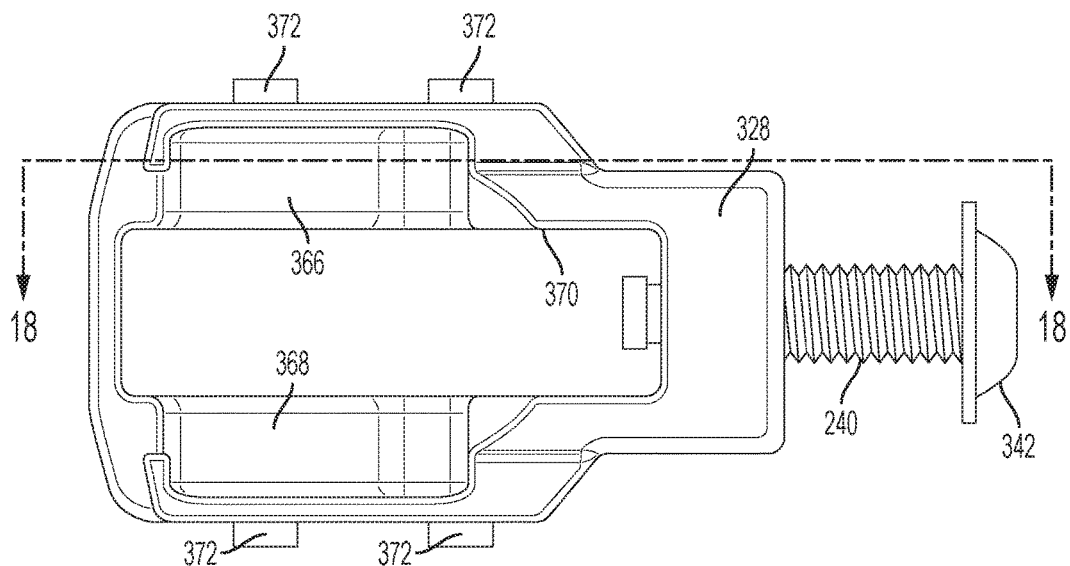
FIG. 14 is a bottom plan view of a traveling wedge block of the actuator assembly depicted in FIG. 13.

As depicted in FIGS. 13 and 14, traveling wedge block 328 is a generally rectangular block having a threaded hole 364 in an outboard end. Threaded hole 364 is configured to accept tightening screw 240, such that rotation of the tightening screw causes wedge block 328 to move horizontally toward or away from plate 344 (i.e., in an outboard or inboard direction). Wedge block 328 includes one or more ramped, downward-facing slide surfaces, in this example the wedge block includes a pair of such surfaces 366 and 368. In this example, slide surfaces 366 and 368 are generally parallel to each other, and ramp downward toward the inboard end of the wedge block. In some examples, the one or more slide surfaces may instead ramp upward toward the inboard end.

Traveling wedge block 328 is open at the bottom, such that the ramped slide surfaces are exposed. An elongate aperture 370 exists between slide surfaces 366 and 368. Aperture 370 generally aligns with apertures 320 and 362. Maintenance of this alignment during operation is facilitated by the elongated shape of aperture 370 in the wedge block's direction of travel.

Side surfaces of traveling wedge block 328 may include hooks or protrusions 372, as shown in FIGS. 13 and 14. Hooks 372 facilitate attachment of security cover 336 to wedge block 328, such that the security cover moves with the wedge block when tightening screw 334 is rotated. Security cover 336 may be clipped or otherwise coupled to the wedge block, for example by mating holes 374 of the security cover with corresponding hooks 372.

With reference now to FIGS. 13 and 15-17, wedge follower 330 is a movable component having an upper interface 376 for mating with stem 310 of crossbar connector 304. Wedge follower 330 further includes a central aperture 378 passing vertically through the wedge follower (and through which attachment bolt 238 may pass), and a pair of wedge-shaped side protrusions 380, 382.

Figure 15:
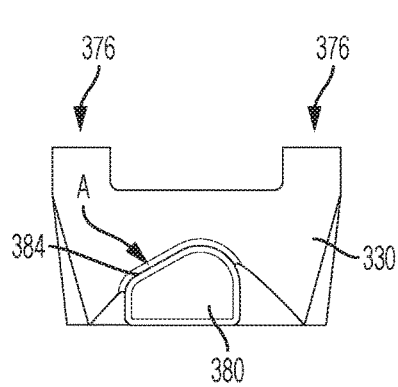
FIG. 15 is a side elevation view of a wedge follower of the actuator assembly depicted in FIG. 13.
Figure 16:
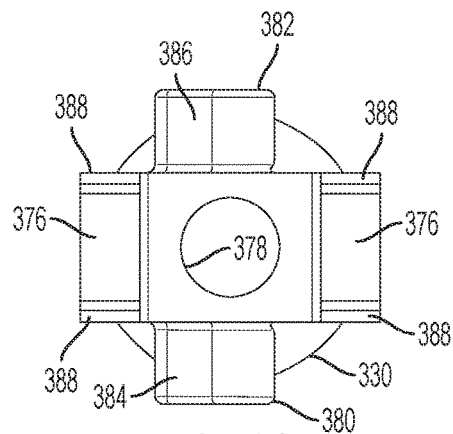
FIG. 16 is a top plan view of the wedge follower of FIG. 15.
Figure 17:
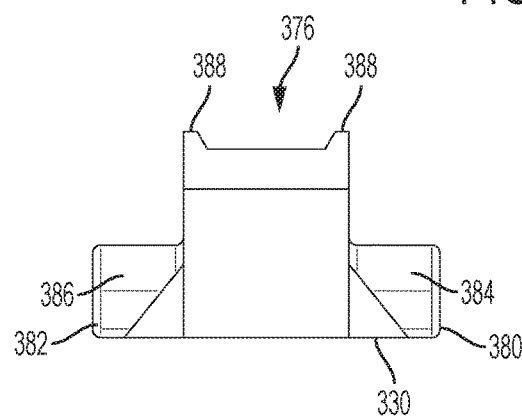
FIG. 17 is an end elevation view of the wedge follower of FIG. 15.

Side protrusions 380 and 382 each have a ramped upper slide surface 384, 386 configured to make frictional, flat-to-flat contact with a respective one of slide surfaces 366 and 368 when the wedge follower is placed into the open bottom of the traveling wedge block. Upper slide surfaces 384 and 386 may be ramped planes, such that the upper slide surfaces mate with correspondingly angled and planar slide surfaces 366 and 368 of the sliding wedge block. As indicated in FIG. 15, the ramped surface of each side protrusion may define an angle A, which may be complementary to an angle B of the correspondingly-ramped planes of surfaces 366 and 368. This flat-to-flat contact facilitates a sliding motion and opposes twisting of the wedge block and wedge follower components relative to each other when in operation.

Accordingly, horizontal repositioning of wedge block 328, e.g., in an outboard or first direction, will cause slide surfaces 366 and 368 to reposition horizontally on side protrusions 380, 382 of the wedge follower. When assembled, wedge follower 330 is substantially blocked from moving in an outboard direction but free to move in a direction orthogonal to the outboard direction (e.g., vertical). Because slide surfaces 366 and 368 are ramped, horizontal repositioning of wedge block 328 will cause a wedging action, such that the side protrusions and wedge follower 330 are urged downward (i.e., orthogonal to the first direction of the wedge block). The downward motion of wedge follower 330 may appear vertical when viewed in a direction of vehicle travel, but may be slightly off-vertical when viewed along the long axis of the crossbar. This is because the traveling wedge block may be oriented in a rotated position with respect to its long axis. Accordingly, "vertical" travel of the wedge follower may actually be normal to the plane generally defined by the width of the wedge block.

To transfer this forced downward motion to crossbar connector 304, thereby causing a clamping action, attachment bolt 332 (also referred to as an attachment screw, a retention member, a threaded member, a second threaded member) passes vertically through aperture 378 of wedge follower 330 and fastens to crossbar connector 304 via threaded hole 324 in stem 310. In some examples, aperture 378 may be threaded. In some examples, aperture 378 may be an unthreaded through-hole. Attachment bolt 238 may be held in position (when not attached to the crossbar connector) by a C-clip, E-clip, or snap ring 387 installed at the upper exit of aperture 378. Various crossbar connector styles may be interchangeably attached to the coupler and actuator assembly using the same attachment bolt.

When wedge follower 330 is coupled to crossbar connector 304 by attachment bolt 238, the shaped bottom of stem 310 nests in the correspondingly shaped upper interface 376 of wedge follower 330. For example, upper interface 376 may include castellations 388, such that crossbar connector 304 is prevented from twisting relative to wedge follower 330 by the castellated mating surfaces. Attachment of a crossbar connector to the wedge follower is complete when the stem is seated on the wedge follower and the attachment bolt is fully tightened. In this illustrative actuator system, attachment bolt 238 is only for securing crossbar connector 304 to the assembly, and bolt 238 is not used to directly actuate the clamp.

Security cover 336 may include any suitable structure configured to prevent access to attachment bolt 238. For example, as shown in FIG. 13, security cover 336 may include a sheet of metal or other tamper-resistant material that covers the head of bolt 238 to prevent unwanted tampering. In this example, the cover is removably attachable to traveling wedge block 328 and shaped such that repositioning of the wedge block in an outboard (i.e., clamp-tightening) direction causes the security cover to block access to the bolt. Conversely, the bolt head may be uncovered when the wedge block is repositioned in a clamp-loosening direction (i.e., inboard).

Figures 18, 19:
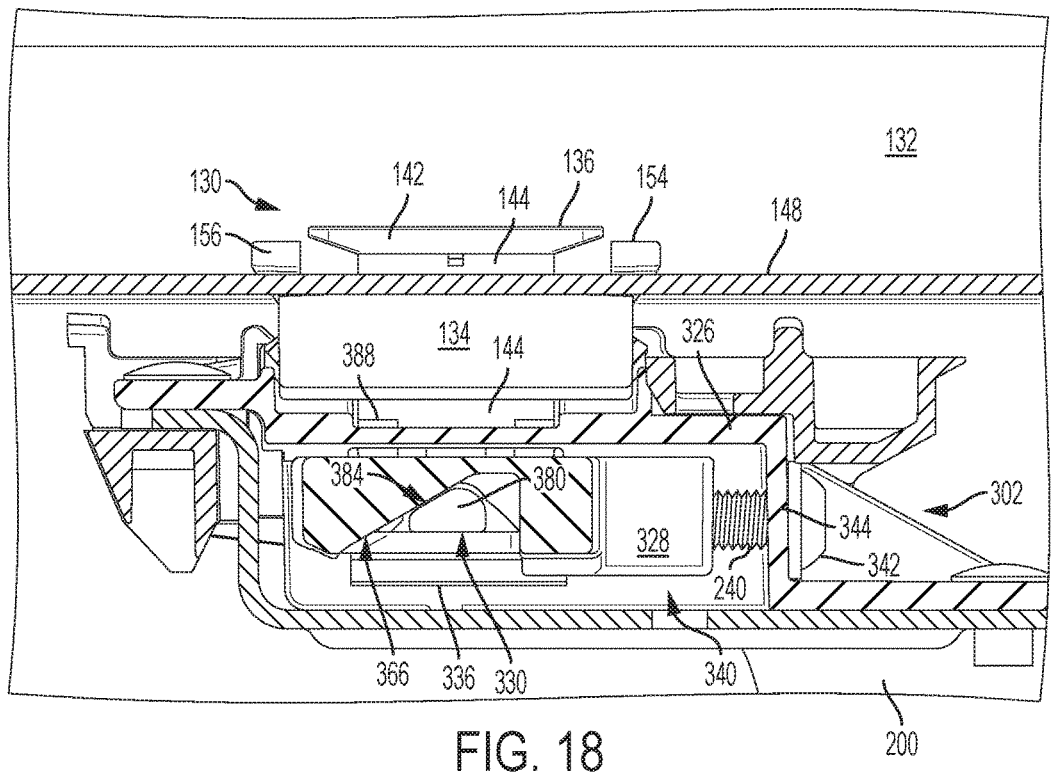
FIG. 18 is a partial, sectional, elevation view of the coupler of FIG. 9 and the slotted crossbar and clamp of FIG. 7, showing the actuator and crossbar clamp in a first, unclamped configuration.
FIG. 19 is a partial, sectional, elevation view of the coupler and crossbar of FIG. 18, showing the actuator and crossbar clamp in a second, clamped configuration.

Turning now to FIGS. 18 and 19, actuator 236 of coupler 200 is shown combined with clamp 130, and shown in a sectional side elevation view. Line 18-18 of FIG. 14 indicates generally where the cross section is taken with respect to traveling wedge block 328. FIG. 18 shows the actuator and clamp in a first, unclamped configuration, and FIG. 19 shows the same actuator and clamp in a second, clamped configuration.

As described above, actuator 236 may be combined with various crossbar clamps and corresponding crossbars. In this example, actuator 236 is combined with crossbar clamp 130 by bolting stem 144 of crossbar connector 136 to wedge follower 330 (using attachment bolt 238). Crossbar clamp 130 and actuator 236 are incorporated into coupler 200, which is shown in engagement with T-slot crossbar 132.

In FIG. 18, crossbar 132 is seated on crossbar seat 134, with guide flanges 154 and 156 inserted into the crossbar slot. The crossbar is captured by flange 142 of crossbar connector 136, and stem 144 extends downward through the crossbar slot. However, flange 142 is in a raised position relative to lip 148 of the crossbar. In other words, clamp 130 is in an unclamped position, and flange 142 is not applying force to hold the crossbar against the crossbar seat.

With continuing reference to FIG. 18, stem 144 extends from flange 142 through the crossbar slot and through aperture 152 of crossbar seat 134 to mate with the castellated support surface of wedge follower 330. Wedge follower 330 is generally disposed within traveling wedge block 328, with the upper slide surfaces of the wedge follower's side protrusions in frictional contact with the slide surfaces of the traveling wedge block. For example, upper slide surface 384 is shown in contact with slide surface 366. It should be understood that upper slide surface 386 is similarly in contact with slide surface 368, but that this portion of the assembly is obscured in FIGS. 18 and 19. In the unclamped configuration shown in FIG. 18, traveling wedge block 328 is horizontally spaced from plate 344 of housing 326, and held in position by tightening screw 240.

Turning to FIG. 19, traveling wedge block 328 has been horizontally repositioned in an outboard direction (i.e., to the right in the drawing), by rotation of tightening screw 240, such that the traveling wedge block is now closer to plate 344. Rotation of screw 240 may be performed by any suitable method, such as using a driver or other tool configured to mate with screw head 342. This repositioning of wedge block 328 is generally indicated by an arrow C.

As described above, wedge follower 330 is bolted to stem 144 of crossbar connector 136. Furthermore, the assembled wedge follower and crossbar connector are blocked from moving horizontally by the confines of the various apertures they pass through (e.g., apertures 152, 362, 370). However, the wedge follower/crossbar connector assembly does have some freedom to move up and down.

When wedge block 328 is repositioned as shown, ramped, downward-facing slide surfaces 366 and 368 are also moved in the outboard direction. This changes the effective vertical position of slide surfaces 366 and 368 at their point of interaction with the side protrusions, thereby applying a downward force on the side protrusions. Side protrusions 366 and 368 may have any suitable profile shape, and may comprise round pins or other shapes. In this example, side protrusions 366 and 368 have ramped planar surfaces that complement the ramped planar faces of surfaces 366 and 368. As described above, this feature helps to prevent twisting and other undesired moments. In some examples, this feature increases the frictional contact area between the wedge block and wedge follower, which may improve holding forces and prevent loosening of the overall mechanism.

Application of the downward force on side protrusions 366 causes wedge follower 330 and therefore the crossbar connector 136 to move along a downward path, as indicated by an arrow D in FIG. 19. This downward movement brings flange 142 down onto lips 148 and 150, and secures (i.e., clamps) crossbar 132 against crossbar seat 134. Accordingly, actuator 236 translates the repositioning of traveling wedge block 328 in a first direction (e.g., horizontal) into the repositioning of crossbar connector 136 in a second direction (e.g., substantially vertical), where the second direction is substantially orthogonal to the first direction. Said another way, actuator 236 translates rotational manipulation of a horizontal member (i.e., tightening screw 240) into substantially vertical tightening of a clamp portion (i.e., connector 136). It should be understood that the terms horizontal and vertical are used here in the context of the standard mounting position of the coupler. Other mutually orthogonal or otherwise transverse directions may be substituted without going beyond the scope of the present disclosure.

First Illustrative Method

Figure 20:
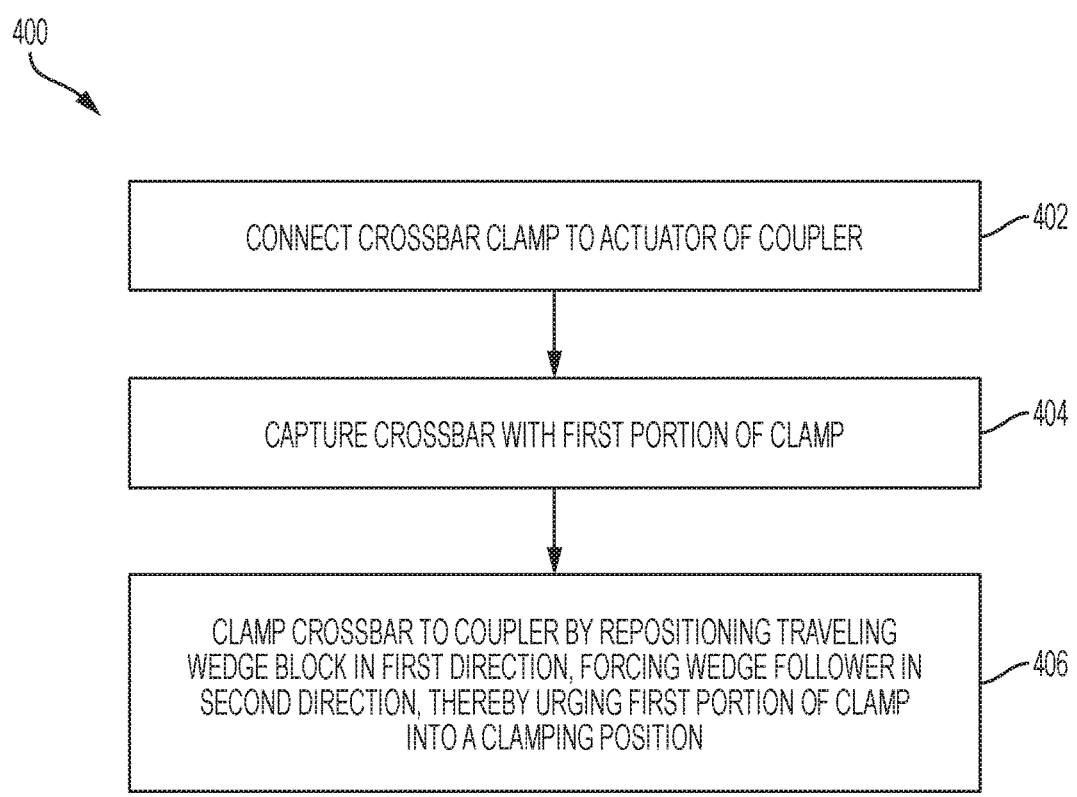
FIG. 20 is a flow chart showing steps of an illustrative method for attaching a crossbar to a vehicle.

This section describes steps of an illustrative method for attaching a crossbar to a vehicle; see FIG. 20. Aspects of crossbars, couplers, and/or actuators described above may be utilized in the method steps described below. Where appropriate, reference may be made to previously described components and systems that may be used in carrying out each step. These references are for illustration, and are not intended to limit the possible ways of carrying out any particular step of the method.

FIG. 20 is a flowchart illustrating steps performed in an illustrative method, and may not recite the complete process or all steps of the method. FIG. 20 depicts multiple steps of a method, generally indicated at 400, which may be performed in conjunction with crossbar clamping systems and devices according to aspects of the present disclosure. Although various steps of method 400 are described below and depicted in FIG. 20, the steps need not necessarily all be performed, and in some cases may be performed in a different order than the order shown.

Step 402 includes connecting a crossbar clamp (e.g., clamp 100, clamp 130, clamp 170) to a clamp actuator (e.g., actuator 236) of a coupler assembly (e.g., coupler 200). The clamp actuator includes a traveling wedge block (e.g., wedge block 328) operatively connected to a movable wedge follower (e.g., follower 330), such that a first portion (e.g., connector 304) of the crossbar clamp is attached to and movable with the wedge follower. In some examples, step 402 may include bolting the first portion of the crossbar clamp to the clamp actuator (e.g., using bolt 238).

In some examples, the crossbar clamp may be selected from a plurality of different crossbar clamps. For example, different crossbar clamps may be suitable for different crossbar styles. For example, crossbar clamp 100 for round crossbar 102, crossbar clamp 130 for slotted crossbar 132, and/or crossbar clamp 170 for aero bar 172.

Step 404 includes capturing a crossbar (e.g., crossbar 102, crossbar 132, crossbar 172) with the first portion of the crossbar clamp. In some examples, capturing the crossbar with the first portion of the crossbar clamp may include inserting the crossbar into a sleeve portion of the crossbar clamp (see clamps 100 and 170). In some examples, capturing the crossbar with the first portion of the crossbar clamp may include inserting a T-shaped connector of the crossbar clamp into a T-slot of the crossbar (see clamp 130 and bar 132).

Step 406 includes clamping the crossbar to the coupler assembly by repositioning the traveling wedge block in a first direction across the movable wedge follower, such that the movable wedge follower is forced in a second direction, urging the first portion of the crossbar clamp into a clamping position. The first direction is substantially parallel to a long axis of the crossbar. The second direction may be substantially orthogonal to the first direction. The second direction may be substantially downward (e.g., vertical), and the first direction may be horizontal. The first direction may be an outboard direction.

In some examples, urging the first portion of the crossbar clamp into the clamping position includes urging the first portion toward a second portion (e.g., crossbar seat 306) of the crossbar clamp.

In some examples, repositioning the traveling wedge block includes manually operating a mover of the wedge block, wherein the mover of the wedge block is accessible from a position outboard of the coupler. In some examples, repositioning the traveling wedge block includes manually rotating a threaded screw (e.g., screw 240) inserted into the traveling wedge block.

Method 400 may further include clamping a vehicle interface portion of the coupler assembly to a corresponding physical feature of a vehicle. In some examples, the physical feature of the vehicle is a vehicle rooftop, and the vehicle interface portion is a retractable pin-style of interface, connectible to a base portion bolted to the vehicle roof (see coupler 200).

Illustrative Pitch Adjustment Interface

Figure 21:
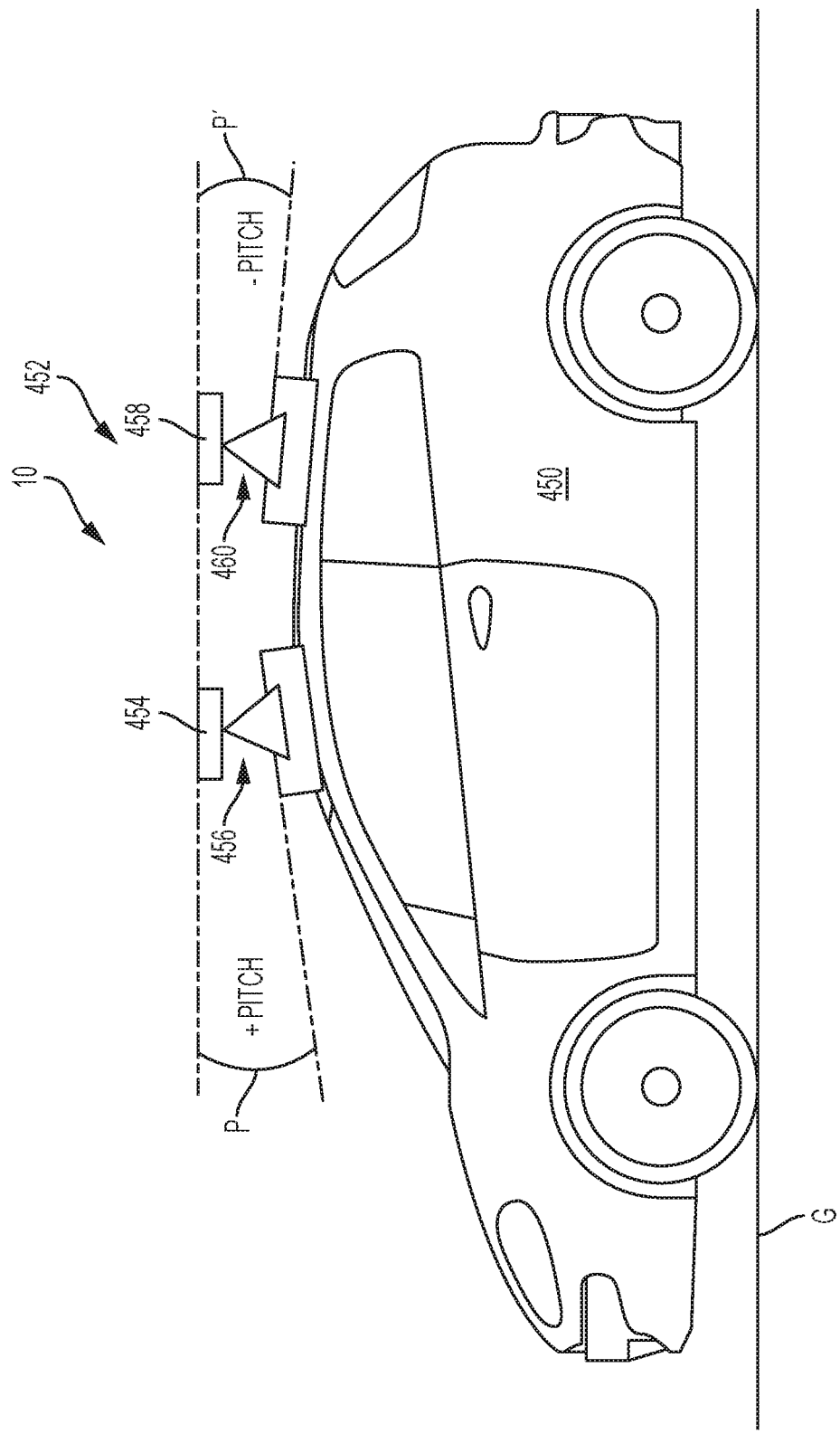
FIG. 21 is a schematic side elevation view of a vehicle having a rooftop rack and depicting illustrative pitch angles.

FIG. 21 is a schematic side view of a vehicle 450 having a rack 452 mounted on its roof. Rack 452 includes a forward crossbar 454 mounted to vehicle 450 by a coupler 456, and an aft crossbar 458 mounted to vehicle 450 by a coupler 460. As depicted in FIG. 21, crossbars 454 and 458 have a horizontal (i.e., zero degree) pitch angle with respect to ground (G). However, due to the sloping of the roof of vehicle 450, crossbar 454 has a positive pitch angle P with respect to coupler 456 (and the vehicle rooftop). Similarly, crossbar 458 has a negative pitch angle P' with respect to coupler 460 (and the vehicle rooftop).

As shown in FIGS. 22-27 (was 18-23), this section describes a pitch adjustment interface 500 (also referred to as a pitch selection mechanism, detent mechanism, pitch assembly, curved interface) of coupler 200. As described and shown in the previous section with respect to FIGS. 18 and 19, crossbar 132 is attached to coupler 200 by clamp 130, actuated by actuator 236.

Pitch adjustment interface 500 is an example of pitch adjustment interface 32. In this example, interface 500 includes lower mating surface 160 of crossbar seat 134 and curved mating surfaces on support surface 338 of housing 326. The curved lower mating surface of the crossbar seat forms a horizontal cylindrical segment. A corresponding concave shape is formed by the curved mating surfaces on the housing's support surface. Teeth 162 on the crossbar seat are configured to mesh with teeth 358, 360 on the housing. The teeth are configured to mesh when crossbar seat 134 is in one of several discrete orientations relative to the support surface (i.e., relative to the remainder of the coupler). The teeth are also aligned in an inboard-outboard direction. This results in the discrete orientations corresponding to different pitch angles for crossbar 132, which is supported on the crossbar seat.

Figure 22:
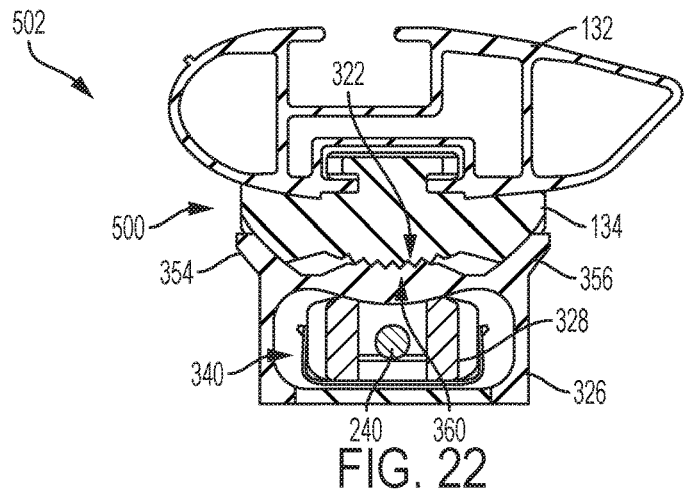
FIG. 22 is a sectional elevation view of the crossbar, clamp, and actuator of FIG. 19, in a first pitch configuration.
Figure 23:
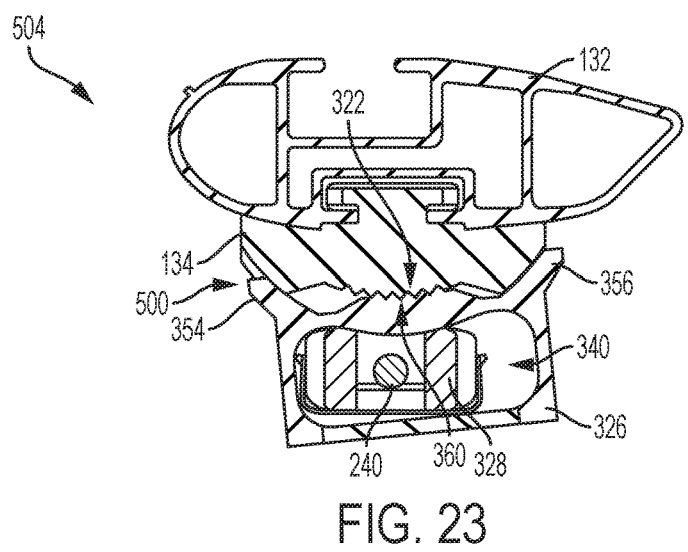
FIG. 23 is a sectional elevation view of the crossbar, clamp, and actuator of FIG. 19, in a second pitch configuration.
Figure 24:
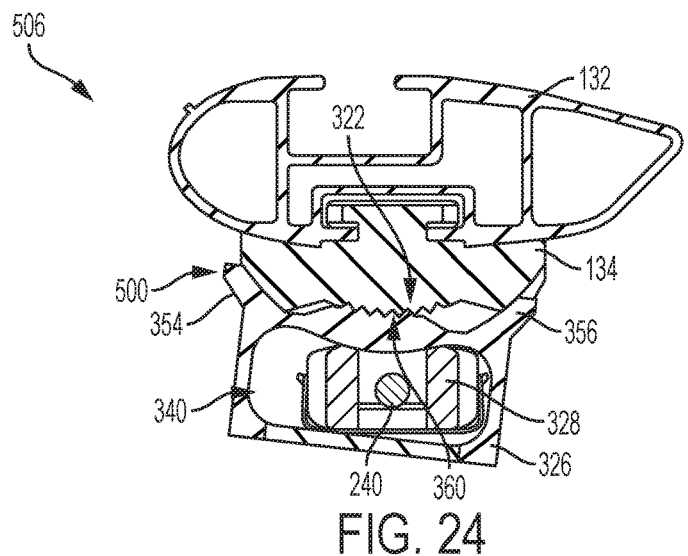
FIG. 24 is a sectional elevation view of the crossbar, clamp, and actuator of FIG. 19, in a third pitch configuration.
Figure 25:
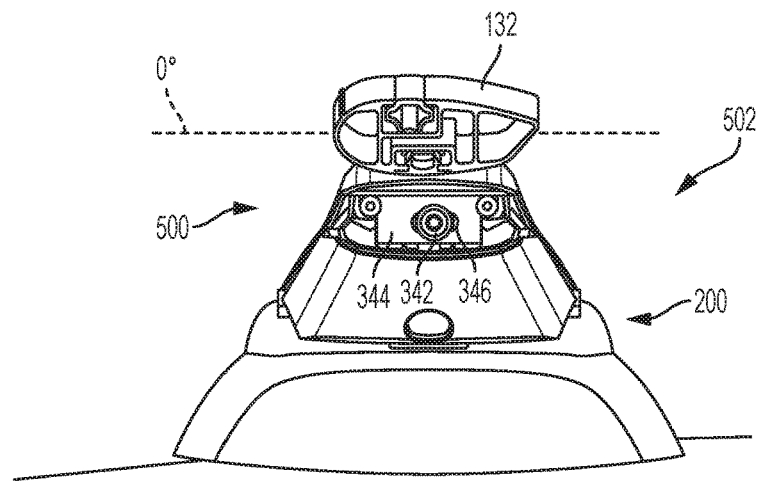
FIG. 25 is an elevation view of the assembled crossbar and coupler of FIG. 19, in the first pitch configuration of FIG. 22.
Figure 26:
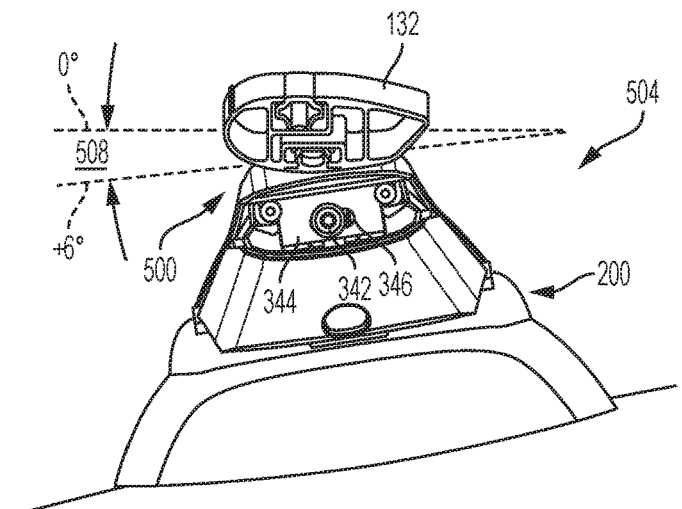
FIG. 26 is an elevation view of the assembled crossbar and coupler of FIG. 19, in the second pitch configuration of FIG. 23.
Figure 27:
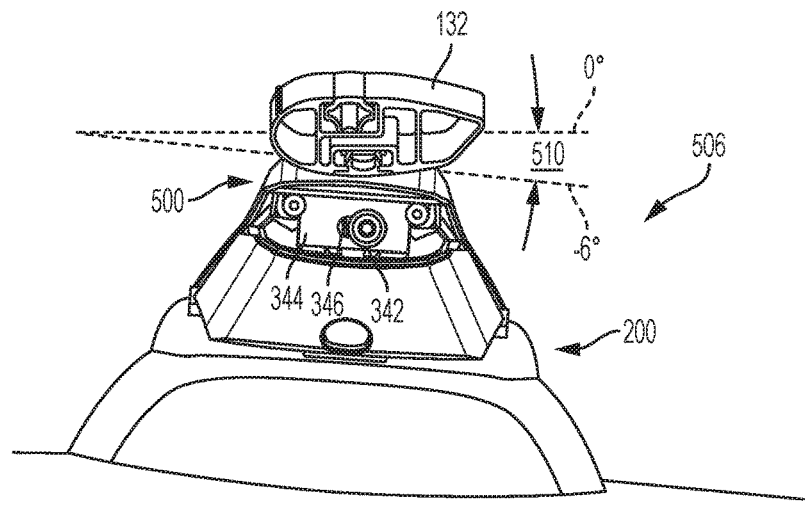
FIG. 27 is an elevation view of the assembled crossbar and coupler of FIG. 19, in the third pitch configuration of FIG. 24.

FIGS. 22-24 are sectional elevation views taken along line 22-22 of FIG. 19, showing three different discrete orientations of pitch adjustment interface 500, the orientations generally indicated at 502, 504, and 506. FIGS. 25-27 are elevation views corresponding respectively to FIGS. 22-24 and showing an external view of orientations 502, 504, and 506. In each orientation, the crossbar pitch is held substantially horizontal relative to the ground, which may be desirable for airflow, noise, and/or cargo attachment and loading purposes. Crossbar pitch is adjusted, however, relative to the coupler and underlying vehicle rooftop. From another perspective, the coupler is pivoted under the horizontal crossbar to account for forward-aft rooftop angle variation.

With continuing reference to FIGS. 22-24, interface 500 is shown in various discrete configurations. In each configuration, teeth 162 of surface 160 are meshed with teeth 358, 360 of support surface 338. Teeth 162, 358, and 360 are examples of projecting members configured to interlock. Other examples include castellations, hooks, snap fittings, and the like, or any combination of these. In some examples, interface 500 may include nesting shapes. For example, interface 500 may include first and second interface surfaces that are "curved" using stepwise flats (e.g., faceted), similar to the outer surface of a hexagonal or octagonal cylinder.

Any suitable number of projecting members (e.g., teeth) may be provided. In this example, there are six teeth 162, with a corresponding number of grooves/teeth 360 (teeth 358, which are substantially identical to teeth 360, are obscured in these drawings). More or fewer teeth and/or grooves may be present, having any suitable spacing (e.g., more fine or more coarse than shown), depending on the adjustability and precision desired. As mentioned in the Overview section, some examples of interface 500 may include high-friction surfaces in addition to or instead of interlocking projections.

In FIGS. 22 and 25, interface 500 is in configuration 502, which is a neutral or zero pitch configuration in which the crossbar is not rotated on its long axis, relative to the coupler and/or roof. In other words, the crossbar generally defines a forward-aft plane, which is horizontal and generally parallel to support surface 338 of the coupler. Accordingly, the crossbar would be generally parallel to an underlying roof of a vehicle on which the coupler is mounted.

As shown in FIG. 22, traveling wedge block 328 is substantially centered in cavity 340 of housing 326. Accordingly, as shown in FIG. 25, head 342 of the tightening screw is substantially centered in slot 346 of plate 344. This centered position may be used as an external indication of the internal positioning of interface 500. Indicia may be provided at or near slot 346 to assist in proper positioning.

In FIGS. 23 and 26, interface 500 is in configuration 504, which is a positive pitch configuration in which the crossbar is leading edge-up relative to the coupler and/or roof. The forward-aft plane of the crossbar is at a positive angle relative to support surface 338 of the coupler. Said another way, housing 326 and coupler 200 are pivoted or swung in a counterclockwise direction relative to the crossbar. Accordingly, the crossbar would be pitched upward relative to an underlying roof of a vehicle on which the coupler is mounted. For example, to compensate for a downward-sloping roof, crossbar 132 may be pitched up as shown, to maintain a substantially horizontal crossbar pitch relative to the ground.

As shown in FIG. 23, traveling wedge block 328 is now forward in cavity 340 of housing 326. Accordingly, as shown in FIG. 26, head 342 of the tightening screw is substantially forward in slot 346 of plate 344. This forward position may be used as an external indication of the internal positioning of interface 500. Indicia may be provided at or near slot 346 to assist in proper positioning.

In FIGS. 24 and 27, interface 500 is in configuration 506, which is a negative pitch configuration in which the crossbar is leading edge-down relative to the coupler and/or roof. The forward-aft plane of the crossbar is at a negative angle relative to support surface 338 of the coupler. Said another way, housing 326 and coupler 200 are pivoted or swung in a clockwise direction relative to the crossbar. Accordingly, the crossbar would be pitched downward relative to an underlying roof of a vehicle on which the coupler is mounted. For example, to compensate for an upward-sloping roof, crossbar 132 may be pitched down as shown, to maintain a substantially horizontal crossbar pitch relative to the ground.

As shown in FIG. 24, traveling wedge block 328 is now rearward or aft in cavity 340 of housing 326. Accordingly, as shown in FIG. 27, head 342 of the tightening screw is substantially aft in slot 346 of plate 344. This aft position may be used as an external indication of the internal positioning of interface 500. Indicia may be provided at or near slot 346 to assist in proper positioning.

As indicated by a pitch angle 508 in FIG. 26 and a pitch angle 510 in FIG. 27, adjustment of interface 500 in this example results in a pitch variation of plus or minus approximately six degrees. The amount of variation is illustrative in nature, and more or less variation is possible, with more or fewer discrete (or continuous) orientations. The amount and/or number of discrete variations may be adjusted, for example, by varying the number, spacing, and/or size of the teeth involved.

Second Illustrative Method

Figure 28:
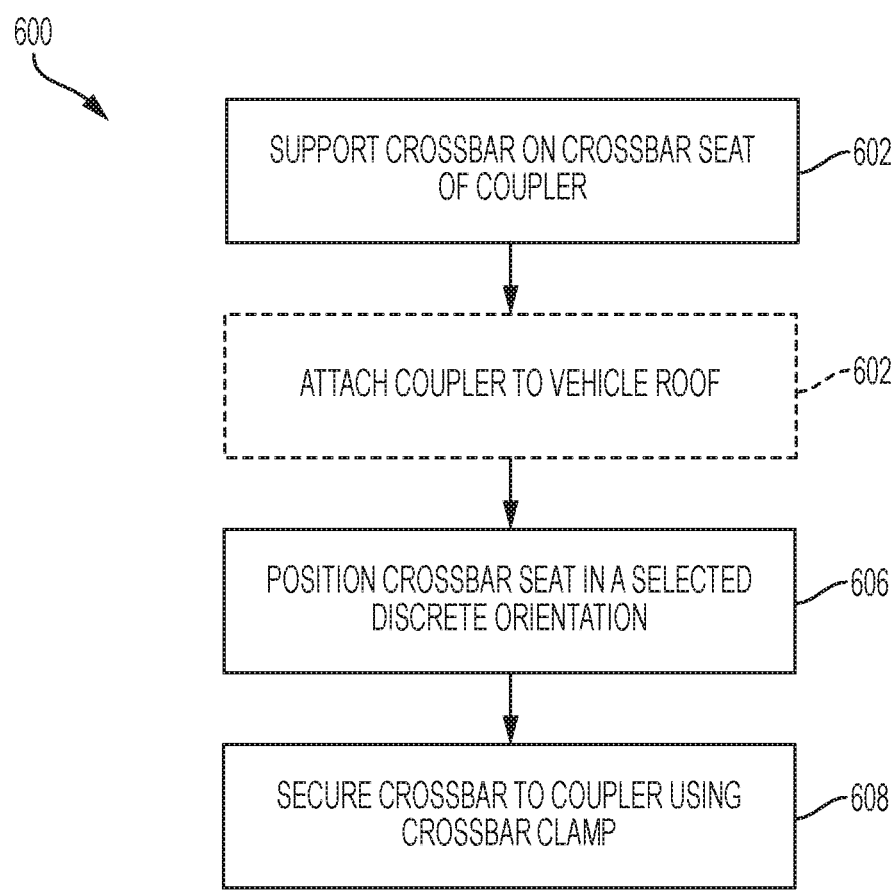
FIG. 28 is a flow chart showing steps of another illustrative method for attaching a crossbar to a vehicle.

This section describes steps of an illustrative method for attaching a crossbar to a vehicle; see FIG. 28. Aspects of crossbars, crossbar clamps, couplers, and pitch adjustment interfaces described above may be utilized in the method steps described below. Where appropriate, reference may be made to previously described components and systems that may be used in carrying out each step. These references are for illustration, and are not intended to limit the possible ways of carrying out any particular step of the method.

FIG. 28 is a flowchart illustrating steps performed in an illustrative method, and may not recite the complete process or all steps of the method. FIG. 28 depicts multiple steps of a method, generally indicated at 600, which may be performed in conjunction with couplers and selectable-pitch crossbar couplers according to aspects of the present disclosure. Although various steps of method 600 are described below and depicted in FIG. 28, the steps need not necessarily all be performed, and in some cases may be performed in a different order than the order shown.

Step 602 includes supporting a crossbar on a crossbar seat portion of a crossbar-to-vehicle coupler. The coupler has a curved interface connecting the seat portion to the coupler. The curved interface has a plurality of interlocking members such that the seat portion is selectively positionable in a plurality of different discrete orientations with respect to the coupler. In some examples, the curved interface comprises a horizontal cylinder segment oriented such that the plurality of discrete orientations pivot the crossbar seat portion around a long axis of the crossbar. For example, the coupler (e.g., coupler 16 or any example thereof) may include a pitch adjustment interface, such as interfaces 32 or 500.

Optional step 604, which may be performed in a different order than discussed here, includes attaching the coupler to a vehicle roof. For example, a vehicle interface 18 of the coupler may be used to removably mount the coupler to the roof. This step may be performed, for example, to determine an angle of the roof, such that the positioning step below can be performed more accurately and/or with direct reference to the angle of the crossbar when mounted.

Step 606 includes positioning the crossbar seat portion on the coupler in a selected one of the plurality of discrete orientations. In some examples, positioning the crossbar seat portion on the coupler includes positioning the crossbar relative to the coupler. In some examples, positioning the crossbar sets a selected pitch angle of the crossbar relative to the coupler, as described above with respect to FIGS. 22-27. Whether or not optional step 604 has been performed, positioning the crossbar seat portion may include selecting an orientation of the crossbar seat portion such that the crossbar has a substantially horizontal pitch with respect to the ground.

Step 608 includes securing the crossbar to the coupler using a crossbar clamp of the coupler. In some examples, step 608 may include securing the crossbar to the coupler includes securing the crossbar to the seat portion. For example, actuator 236 may be used to clamp crossbar 132 against crossbar seat 134 using crossbar connector 136. In some examples, securing the crossbar to the coupler causes the seat portion to be secured in the selected one of the plurality of discrete orientations (e.g., at a selected pitch angle of the crossbar).

Illustrative Crossbar-Coupler Combinations

Figure 29:
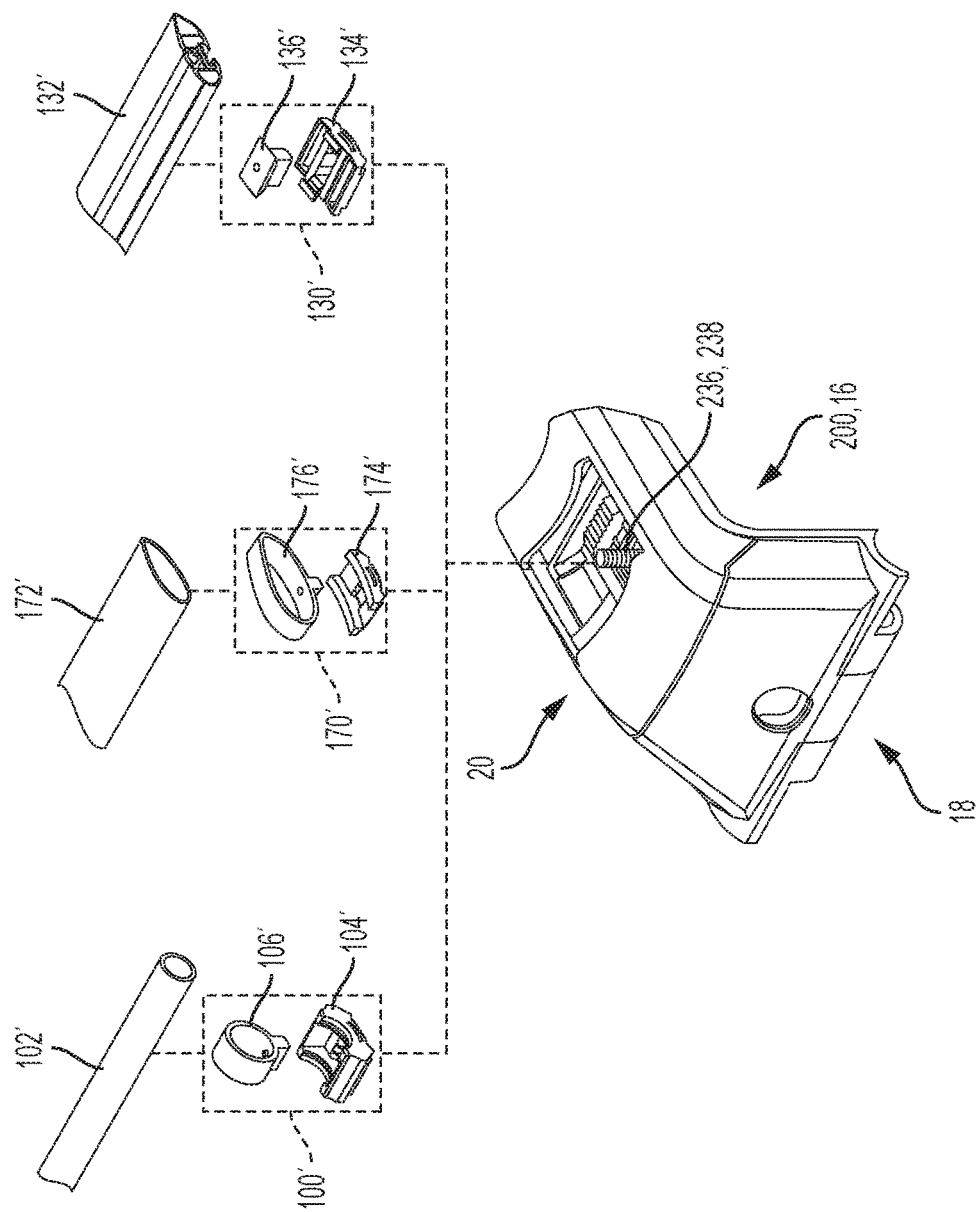
FIG. 29 is a schematic view showing various possible combinations of illustrative crossbars and clamps with the coupler of FIG. 9, according to the present teachings.

As shown in FIG. 29, this section describes various suitable combinations of crossbar-to-vehicle coupler 200 with different crossbars and crossbar clamps. The crossbars and crossbar clamps described in this section are examples of those described above, and have features and functions substantially identical to those already discussed. Accordingly, crossbars and clamps are labeled with primed reference numbers corresponding to the substantially identical versions above.

As indicated in FIG. 29, various interchangeable crossbar clamps may be attached to coupler 200. Specifically, the crossbar connector portion of any suitable crossbar clamp (e.g., clamps 100', 130', 170') may be fastened to attachment bolt 238 of actuator 236 of coupler 200. As described above, the appropriate clamp may be selected based on the corresponding style of crossbar that will be secured to the crossbar interface of coupler 200. Specifically, clamp 100' includes crossbar connector 106' and seat 104' for clamping round crossbar 102'. Similarly, clamp 130' includes crossbar connector 136' and seat 134' for clamping slotted crossbar 132', and clamp 170' includes crossbar connector 176' and seat 174' for clamping aerodynamic crossbar 172'.

Pitch adjustment interface 500 may be included in coupler 200, as described above. However, certain crossbars, such as crossbar 102', may not benefit from such pitch adjustment. Nevertheless, interface 500 may be included in the crossbar such that a user can easily replace the round crossbar with another style as desired.

Third Illustrative Method

Figure 30:
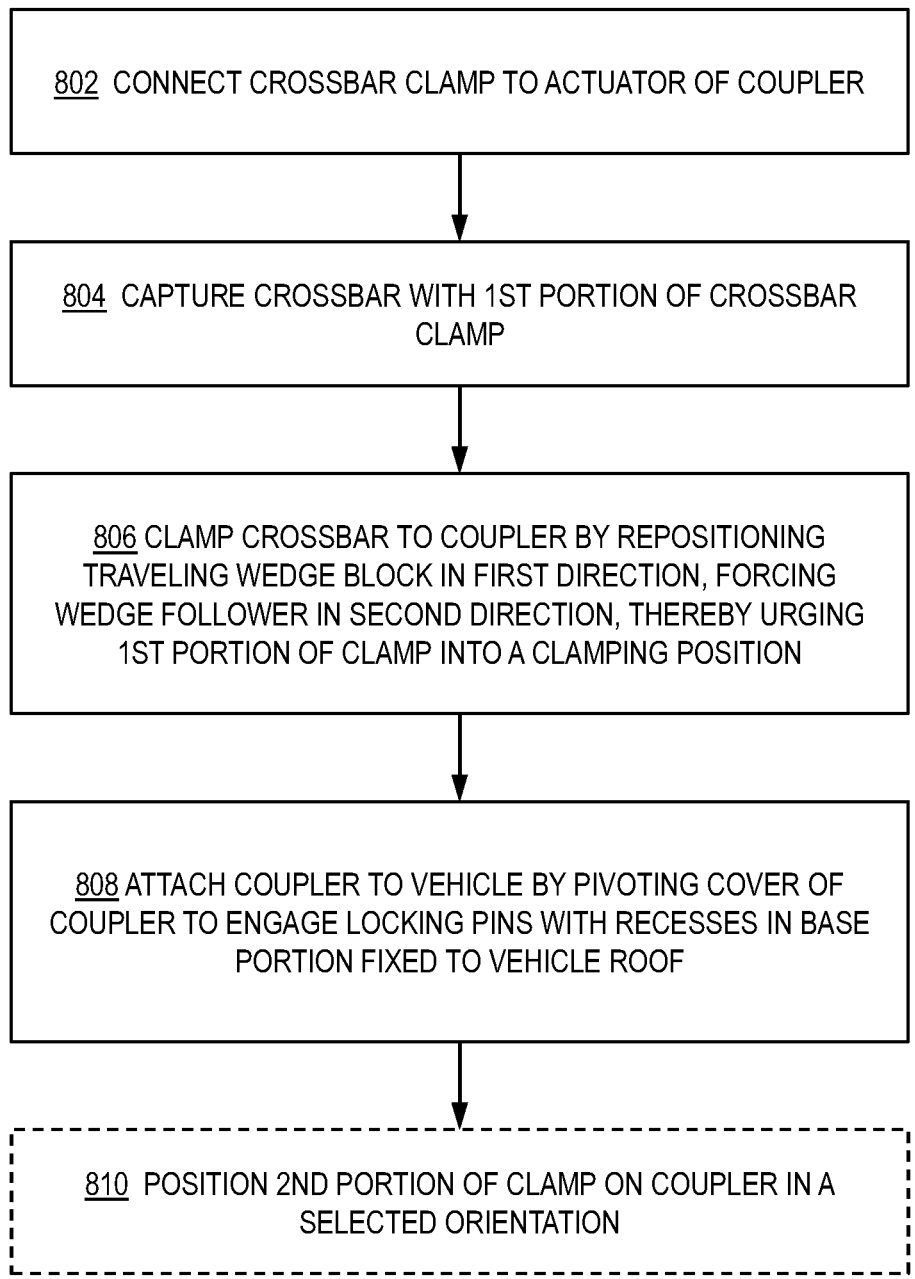
FIG. 30 is a flow chart showing steps of another illustrative method for attaching a crossbar to a vehicle.

This section describes steps of another illustrative method for attaching a crossbar to a vehicle; see FIG. 30. Aspects of crossbars, crossbar clamps, couplers, and pitch adjustment interfaces described above may be utilized in the method steps described below. Where appropriate, reference may be made to previously described components and systems that may be used in carrying out each step. These references are for illustration, and are not intended to limit the possible ways of carrying out any particular step of the method.

FIG. 30 is a flowchart illustrating steps performed in an illustrative method, and may not recite the complete process or all steps of the method. FIG. 30 depicts multiple steps of a method, generally indicated at 800, which may be performed in conjunction with couplers and selectable-pitch crossbar couplers according to aspects of the present disclosure. Although various steps of method 800 are described below and depicted in FIG. 30, the steps need not necessarily all be performed, and in some cases may be performed in a different order than the order shown.

Step 802 includes connecting a crossbar clamp (e.g., clamp 100, clamp 130, clamp 170) to a clamp actuator (e.g., actuator 236) of a coupler (e.g., coupler 200). The clamp actuator includes a traveling wedge block (e.g., wedge block 328) operatively connected to a movable wedge follower (e.g., follower 330), such that a first portion (e.g., connector 304) of the crossbar clamp is attached to and movable with the wedge follower. In some examples, step 802 may include bolting the first portion of the crossbar clamp to the clamp actuator (e.g., using bolt 238).

In some examples, the clamp actuator includes a clamp tightening screw (e.g., screw 240) oriented substantially parallel to the long axis of the crossbar. In some examples, the crossbar clamp may be selected from a plurality of different crossbar clamps. For example, different crossbar clamps may be suitable for different crossbar styles. For example, crossbar clamp 100 for round crossbar 102, crossbar clamp 130 for slotted crossbar 132, and/or crossbar clamp 170 for aero bar 172.

Step 804 includes capturing a crossbar (e.g., crossbar 102, crossbar 132, crossbar 172) with the first portion of the crossbar clamp. In some examples, capturing the crossbar with the first portion of the crossbar clamp may include inserting the crossbar into a sleeve portion of the crossbar clamp (see clamps 100 and 170). In some examples, capturing the crossbar with the first portion of the crossbar clamp may include inserting a T-shaped connector of the crossbar clamp into a T-slot of the crossbar (see clamp 130 and bar 132).

Step 806 includes clamping the crossbar to the coupler by repositioning the traveling wedge block in a first direction substantially parallel to a long axis of the crossbar across the movable wedge follower, such that the movable wedge follower is forced in a second direction, urging the first portion of the crossbar clamp into a clamping position. The second direction may be substantially orthogonal to the first direction. The second direction may be substantially downward (e.g., vertical), and the first direction may be horizontal. The first direction may be an outboard direction.

Step 808 includes attaching the coupler to a vehicle by pivoting a cover (e.g., cover 202) of the coupler from an open position (e.g., position 206) to a closed position (e.g., position 204), such that one or more locking pins (e.g., locking pins 210) operatively connected to the cover engage with one or more recesses (e.g., recesses 212) in a base portion (e.g., base 208) fixed to the vehicle roof.

In some examples, closing the cover causes the tightening screw of the actuator to be inaccessible.

In optional step 810, the coupler further includes a curved interface (e.g., interface 500) connecting a second portion (e.g., a crossbar seat) of the crossbar clamp to the coupler, the curved interface having a plurality of interlocking members such that the second portion is selectively positionable in a plurality of different discrete orientations with respect to the coupler. Step 810 includes positioning the second portion of the crossbar clamp on the coupler in a selected one of the plurality of discrete orientations.

In some examples, step 810 includes selecting an orientation of the crossbar seat portion such that the crossbar has a substantially horizontal pitch with respect to the ground.

In some examples, clamping the crossbar to the coupler includes securing the crossbar against the second portion of the crossbar clamp.

Additional Examples

This section describes additional aspects and features of crossbar-to-vehicle couplers having retractable-pin vehicle interfaces, as well as related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A rack for carrying cargo on top of a vehicle, the rack comprising:
 a crossbar; and
 a coupler configured to mount an end portion of the crossbar on top of a vehicle, the coupler including a vehicle interface for releasably securing the coupler to the vehicle, the vehicle interface including:
  a base portion having one or more recesses and a fastening mechanism configured to affix the base portion to the vehicle, and
  a body portion having a pivotable cover operatively connected to one or more locking pins that move into engagement with the one or more recesses in the base portion when the cover moves from an open position to a closed position, and
 a crossbar interface for releasably securing the crossbar to the coupler, the crossbar interface including:
  a removable crossbar clamp having a crossbar seat and a crossbar connector configured to capture the crossbar and movable relative to the crossbar seat, and
  a crossbar clamp actuator operatively connected to the crossbar connector and configured to urge the crossbar connector downward, such that the crossbar is secured onto the crossbar seat.

A1. The rack of A0, wherein the crossbar clamp actuator is connected to the crossbar connector by an attachment bolt having a substantially vertical orientation.

A2. The rack of any of paragraphs A0 through A1, wherein the crossbar clamp actuator includes a clamp tightening screw having a substantially horizontal orientation.

A3. The rack of any of paragraphs A0 through A2, the crossbar clamp further comprising a first mating surface receivable on a second mating surface of the coupler body in a plurality of orientations, each of the orientations corresponding to a different respective angle of the crossbar relative to the coupler.

A4. The rack of A3, wherein each of the orientations corresponds to a different pitch angle of the crossbar.

A5. The rack of A3, wherein the coupler is transitionable between a first clamped configuration, in which the first mating surface is secured in a first of the orientations and the crossbar is clamped to the coupler at a first angle, and a second clamped configuration, in which the first mating surface is secured in a second of the orientations and the crossbar is clamped to the coupler at a second angle.

A6. The rack of A3, wherein the first mating surface includes a convex portion having a first plurality of teeth, and the second mating surface includes a concave portion having a second plurality of teeth.

B0. A rack for carrying cargo on top of a vehicle, the rack comprising:
 a crossbar having a long axis; and
 a coupler configured to mount an end portion of the crossbar on top of a vehicle, the coupler including a vehicle interface for releasably securing the coupler to the vehicle, the vehicle interface including:
  a base portion having one or more recesses and a fastening mechanism configured to affix the base portion to the vehicle,
  a body portion having a pivotable cover operatively connected to one or more locking pins that move into engagement with the one or more recesses in the base portion when the cover moves from an open position to a closed position, and
 a crossbar interface for releasably securing the crossbar to the coupler, the crossbar interface including:
  a crossbar clamp configured to engage the crossbar, and
  a crossbar clamp actuator operatively connected to the crossbar clamp, a clamp tightening screw of the crossbar clamp actuator having a length that is substantially parallel to the long axis of the crossbar.

B1. The rack of B0, wherein the clamp tightening screw is accessible when the cover is in the open position, and inaccessible when the cover is in the closed position.

B2. The rack of any of paragraphs B0 through B1, wherein the cover pivots on an axis transverse to the long axis of the crossbar.

B3. The rack of any of paragraphs B0 through B2, wherein the clamp tightening screw is accessible from an outboard side of the coupler.

B4. The rack of any of paragraphs B0 through B3, wherein the crossbar clamp is removable from the body of the coupler.

B5. The rack of B4, the crossbar clamp comprising a crossbar seat and a crossbar connector configured to capture the crossbar, the actuator being configured to urge the crossbar connector toward the crossbar seat.

B6. The rack of any of paragraphs B0 through B5, wherein the tightening screw is substantially horizontal and the crossbar clamp actuator is configured to urge a portion of the clamp in a substantially vertical direction.

C0. A method for attaching a crossbar to a vehicle, the method comprising:
connecting a crossbar clamp to a clamp actuator of a crossbar-to-vehicle coupler, the clamp actuator having a traveling wedge block operatively connected to a movable wedge follower, such that a first portion of the crossbar clamp is attached to and movable with the wedge follower;
capturing a crossbar with the first portion of the crossbar clamp;
clamping the crossbar to the coupler by repositioning the traveling wedge block in a first direction substantially parallel to a long axis of the crossbar across the movable wedge follower, such that the movable wedge follower is forced in a second direction, urging the first portion of the crossbar clamp into a clamping position; and
attaching the coupler to a vehicle by pivoting a cover of the coupler from an open position to a closed position, such that one or more locking pins operatively connected to the cover engage with one or more recesses in a base portion fixed to the vehicle roof.

C1. The method of C0, wherein the clamp actuator includes a clamp tightening screw oriented substantially parallel to the long axis of the crossbar.

C2. The method of C1, wherein closing the cover causes the tightening screw to be inaccessible.

C3. The method of any of paragraphs C0 through C2, the coupler further including a curved interface connecting a second portion of the crossbar clamp to the coupler, the curved interface having a plurality of interlocking members such that the second portion is selectively positionable in a plurality of different discrete orientations with respect to the coupler.

C4. The method of C3, further comprising positioning the second portion of the crossbar clamp on the coupler in a selected one of the plurality of discrete orientations.

C5. The method of C4, wherein positioning the second portion of the clamp includes selecting an orientation of the crossbar seat portion such that the crossbar has a substantially horizontal pitch with respect to the ground.

C6. The method of C3, wherein clamping the crossbar to the coupler includes securing the crossbar against the second portion of the crossbar clamp.

C7. The method of C3, wherein the second portion of the crossbar clamp comprises a crossbar seat.

C8. The method of any of paragraphs C0 through C7, wherein the first portion of the crossbar clamp comprises a crossbar connector.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A rack for carrying cargo on top of a vehicle, the rack comprising:
a crossbar; and
a coupler configured to mount an end portion of the crossbar on top of a vehicle, the coupler including a vehicle interface for releasably securing the coupler to the vehicle, the vehicle interface including:
a base portion having one or more recesses and a fastening mechanism configured to affix the base portion to the vehicle, and
a body portion having a pivotable cover operatively connected to one or more extendable locking pins that move axially in a direction parallel to the direction of vehicle travel, into engagement with the one or more recesses in the base portion when the cover moves from an open position to a closed position, and
a crossbar interface for releasably securing the crossbar to the coupler, the crossbar interface including:
a removable crossbar clamp having a crossbar seat and a crossbar connector configured to capture the crossbar and movable relative to the crossbar seat, and
a crossbar clamp actuator operatively connected to the crossbar connector and configured to urge the crossbar connector downward, such that the crossbar is secured onto the crossbar seat.

2. The rack of claim 1, wherein the crossbar clamp actuator is connected to the crossbar connector by an attachment bolt having a substantially vertical orientation.

3. The rack of claim 1, wherein the crossbar clamp actuator includes a clamp tightening screw having a substantially horizontal orientation.

4. The rack of claim 1, the crossbar clamp further comprising a first mating surface receivable on a second mating surface of the coupler body in a plurality of orientations, each of the orientations corresponding to a different respective angle of the crossbar relative to the coupler.

5. The rack of claim 4, wherein the coupler is transitionable between a first clamped configuration, in which the first mating surface is secured in a first of the orientations and the crossbar is clamped to the coupler at a first angle, and a second clamped configuration, in which the first mating surface is secured in a second of the orientations and the crossbar is clamped to the coupler at a second angle.

6. The rack of claim 4, wherein the first mating surface includes a convex portion having a first plurality of teeth, and the second mating surface includes a concave portion having a second plurality of teeth.

7. A rack for carrying cargo on top of a vehicle, the rack comprising:
   a crossbar having a long axis; and
   a coupler configured to mount an end portion of the crossbar on top of a vehicle, the coupler including a vehicle interface for releasably securing the coupler to the vehicle, the vehicle interface including:
      a base portion having one or more recesses and a fastening mechanism configured to affix the base portion to the vehicle,
      a body portion having a pivotable cover operatively connected to one or more locking pins that move into engagement with the one or more recesses in the base portion when the cover moves from an open position to a closed position, and
      a crossbar interface for releasably securing the crossbar to the coupler, the crossbar interface including:
         a crossbar clamp configured to engage the crossbar, and
         a crossbar clamp actuator operatively connected to the crossbar clamp, a clamp tightening screw of the crossbar clamp actuator having a length that is substantially parallel to the long axis of the crossbar.

8. The rack of claim 7, wherein the clamp tightening screw is accessible when the cover is in the open position, and inaccessible when the cover is in the closed position.

9. The rack of claim 7, wherein the cover pivots on an axis transverse to the long axis of the crossbar.

10. The rack of claim 7, the crossbar clamp comprising a crossbar seat and a crossbar connector configured to capture the crossbar, the actuator being configured to urge the crossbar connector toward the crossbar seat.

11. The rack of claim 7, wherein the tightening screw is substantially horizontal and the crossbar clamp actuator is configured to urge a portion of the clamp in a substantially vertical direction.

* * * * *